(12) United States Patent
Palaniappa et al.

(10) Patent No.: US 7,565,843 B2
(45) Date of Patent: *Jul. 28, 2009

(54) PACKAGED DEVICE ADAPTER WITH TORQUE INDICATING ASSEMBLY

(75) Inventors: Ilavarasan Palaniappa, Apple Valley, MN (US); Mickiel P. Fedde, Eagan, MN (US); Ranjit Raghunath Patil, Eden Prairie, MN (US); Meghann Fedde, Minneapolis, MN (US); Sultan Mahmood Faiz, St Paul, MN (US)

(73) Assignee: Ironwood Electronics, Inc., Burnsville, MN (US)

( * ) Notice: Subject to any disclaimer, the term of this patent is extended or adjusted under 35 U.S.C. 154(b) by 125 days.

This patent is subject to a terminal disclaimer.

(21) Appl. No.: 11/511,760

(22) Filed: Aug. 29, 2006

(65) Prior Publication Data

US 2008/0053244 A1 Mar. 6, 2008

(51) Int. Cl.
*G01L 3/00* (2006.01)
*H01R 12/00* (2006.01)

(52) U.S. Cl. ..................... 73/862.08; 439/73
(58) Field of Classification Search ............... 73/862.08
See application file for complete search history.

(56) References Cited

U.S. PATENT DOCUMENTS

| | | | |
|---|---|---|---|
| 4,460,223 A | 7/1984 | Brown et al. | |
| 4,472,097 A | 9/1984 | Kiefer et al. | |
| 4,472,098 A | 9/1984 | Kiefer | |
| 4,512,697 A | 4/1985 | Cascini | |
| 4,590,826 A * | 5/1986 | McKean | 81/53.2 |
| 4,687,392 A | 8/1987 | Bidwell | |
| 5,094,628 A * | 3/1992 | Kano | 439/620.04 |
| 5,377,550 A * | 1/1995 | Thompson, III | 73/862.322 |
| 5,468,158 A | 11/1995 | Roebuck et al. | |
| 5,681,135 A | 10/1997 | Simonson | |
| 5,730,620 A | 3/1998 | Chan et al. | |
| 5,741,141 A | 4/1998 | O'Malley | |
| 5,779,409 A | 7/1998 | Manzolli | |
| 5,784,738 A | 7/1998 | Updike | |
| 5,791,914 A | 8/1998 | Loranger et al. | |
| 5,793,618 A | 8/1998 | Chan et al. | |
| 5,882,221 A | 3/1999 | Nguyen et al. | |
| 5,892,245 A | 4/1999 | Hilton | |
| 5,975,915 A | 11/1999 | Yamazaki et al. | |

(Continued)

OTHER PUBLICATIONS

"SSC Springs" [online]. Spring Specialists Corporation, Holcomb, IL, Copyright 2006 [retrieved on Aug. 9, 2006]. Retrieved from the Internet: <http://www.springspecialists.com/ssc_springs.htm>; 2 pgs.

(Continued)

*Primary Examiner*—Lisa M Caputo
*Assistant Examiner*—Octavia Davis
(74) *Attorney, Agent, or Firm*—Mueting, Raasch & Gebhardt, P.A.

(57) ABSTRACT

An adapter apparatus and method includes using an adapter body that includes a threaded opening. A torque indicating assembly is used in applying a force upon a packaged device received in a cavity of the adapter body. The torque indicating assembly includes a threaded interface member and a torque indicator.

33 Claims, 15 Drawing Sheets

U.S. PATENT DOCUMENTS

| | | | |
|---|---|---|---|
| 5,989,039 A | 11/1999 | Sik | |
| 5,997,316 A | 12/1999 | Kunzel | |
| 6,022,225 A | 2/2000 | Chapin et al. | |
| 6,082,941 A | 7/2000 | Dupont et al. | |
| 6,123,552 A | 9/2000 | Sakata et al. | |
| 6,152,744 A | 11/2000 | Maeda | |
| 6,217,341 B1 * | 4/2001 | Glick et al. | 439/66 |
| 6,325,638 B1 | 12/2001 | Chapin et al. | |
| 6,394,820 B1 | 5/2002 | Palaniappa et al. | |
| 6,439,897 B1 | 8/2002 | Ikeya | |
| 6,497,582 B1 | 12/2002 | Hoffmeyer | |
| 6,533,589 B1 | 3/2003 | Palaniappa et al. | |
| 6,755,668 B2 * | 6/2004 | Copper et al. | 439/83 |
| 6,802,680 B1 | 10/2004 | Rubenstein | |
| 6,805,563 B2 | 10/2004 | Ohashi | |
| 6,877,993 B2 | 4/2005 | Palaniappa et al. | |
| 6,910,898 B2 | 6/2005 | Suzuki et al. | |
| 6,979,203 B2 | 12/2005 | Mae | |
| 6,981,882 B1 | 1/2006 | Palaniappa | |
| 7,004,760 B2 | 2/2006 | Kawazoe et al. | |
| 7,270,509 B2 * | 9/2007 | Disantis et al. | 411/332 |

OTHER PUBLICATIONS

"Torsion Spring Calculator and Formula" [online]. Engineers Edge, Monroe, GA, Copyright 2006 [retrieved on Aug. 9, 2006]. Retrieved from the Internet: <http://www.engineersedge.com/spring_torsion_calc.htm>; 2 pgs.

* cited by examiner

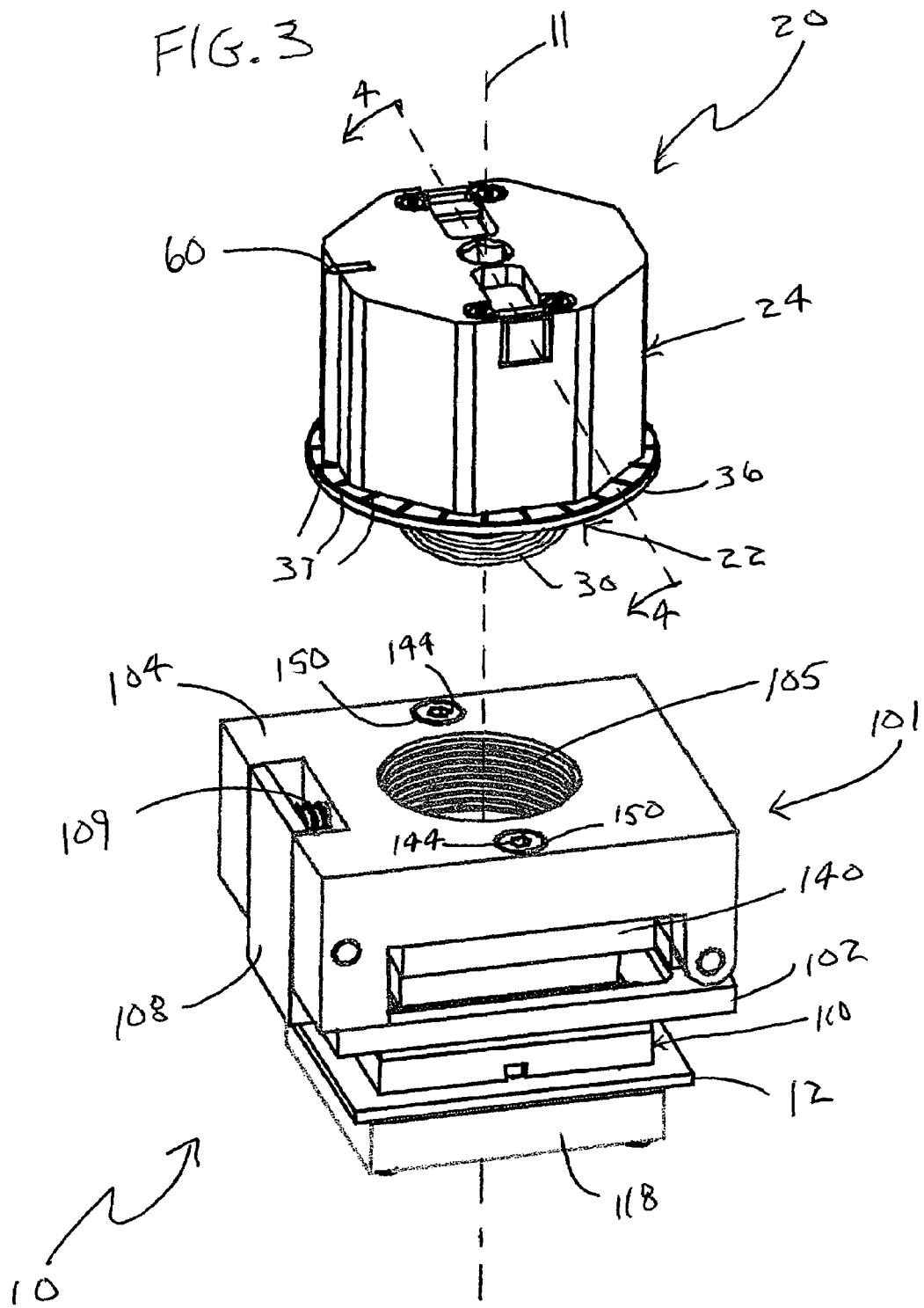

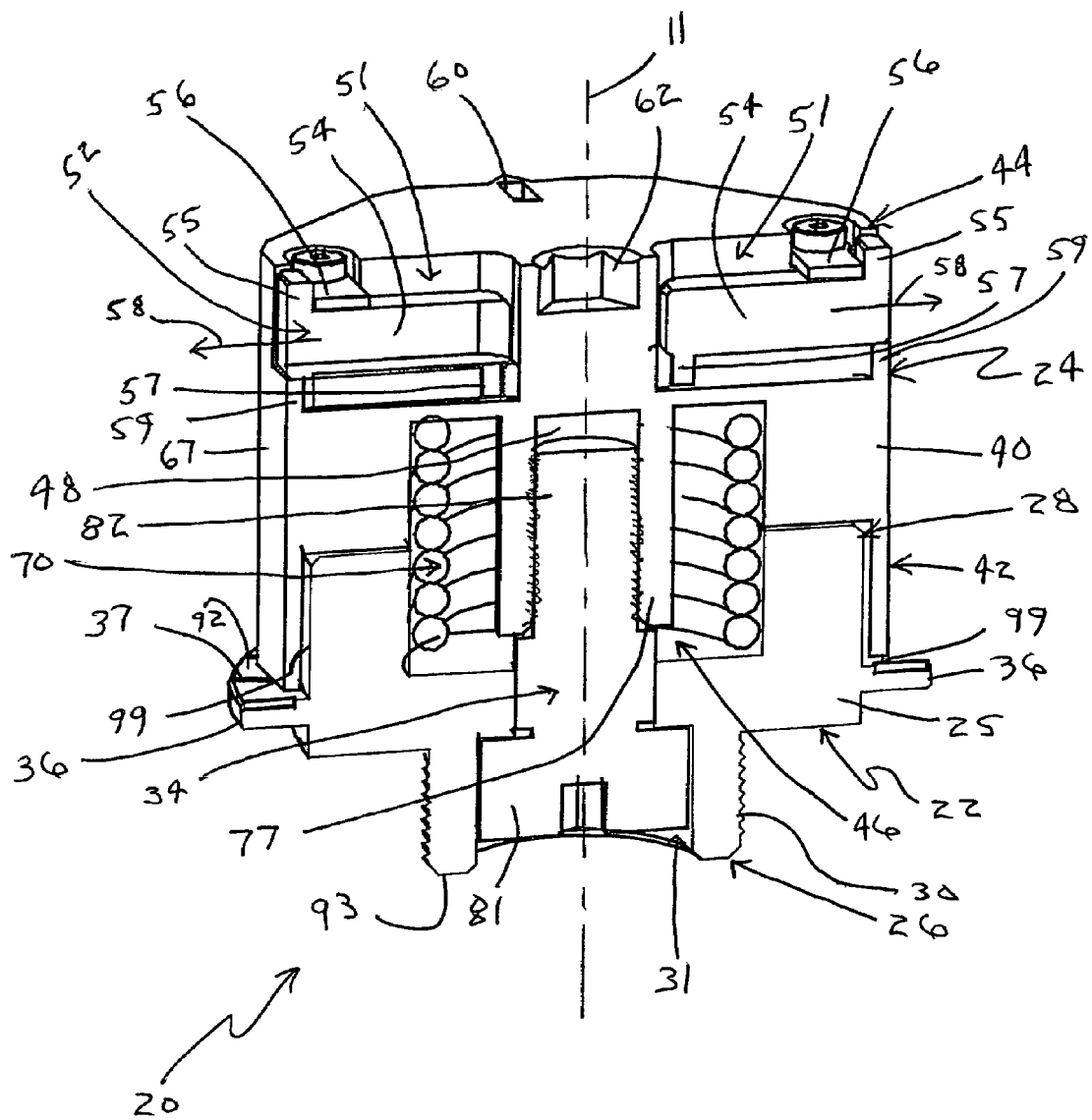

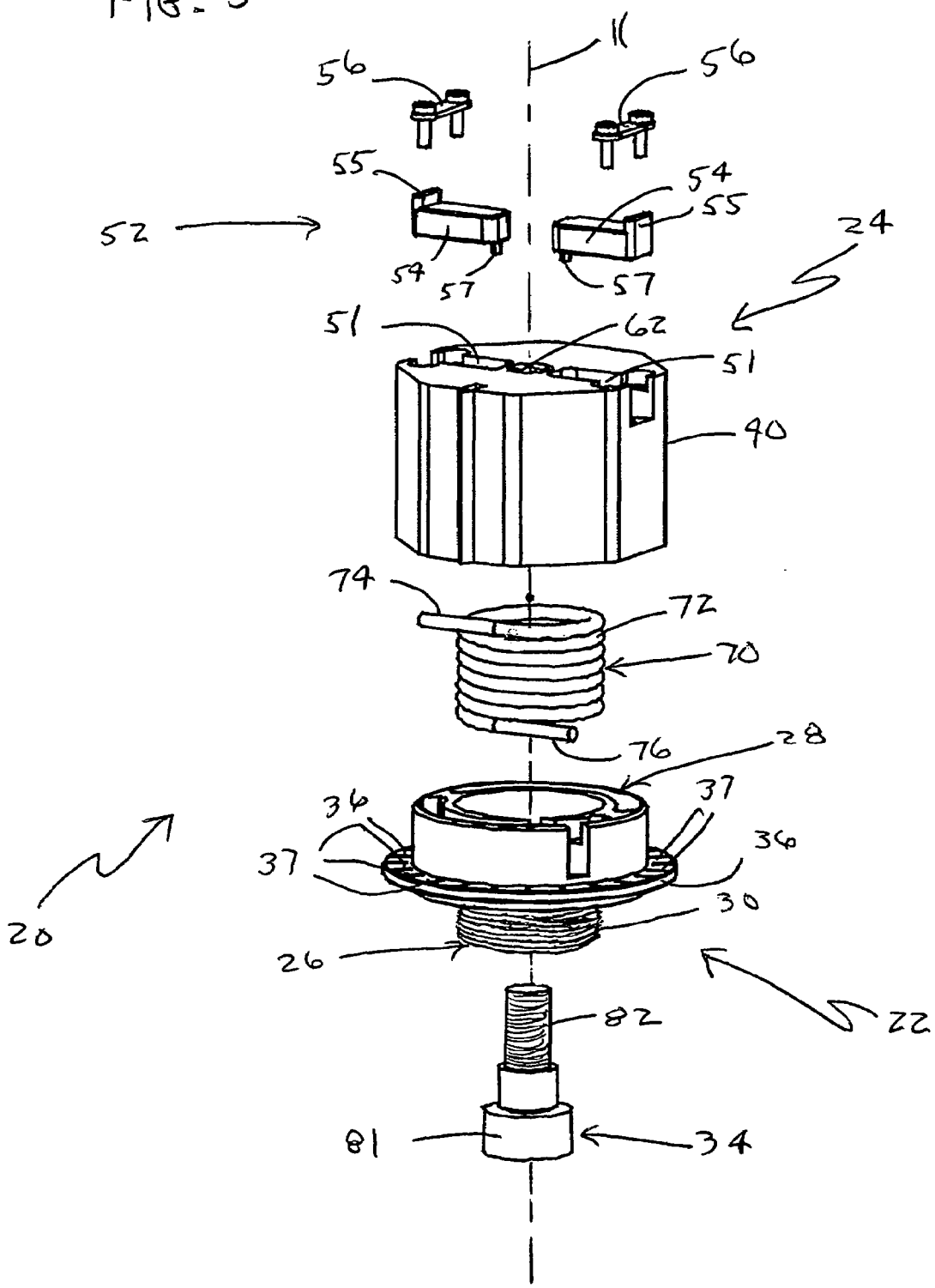

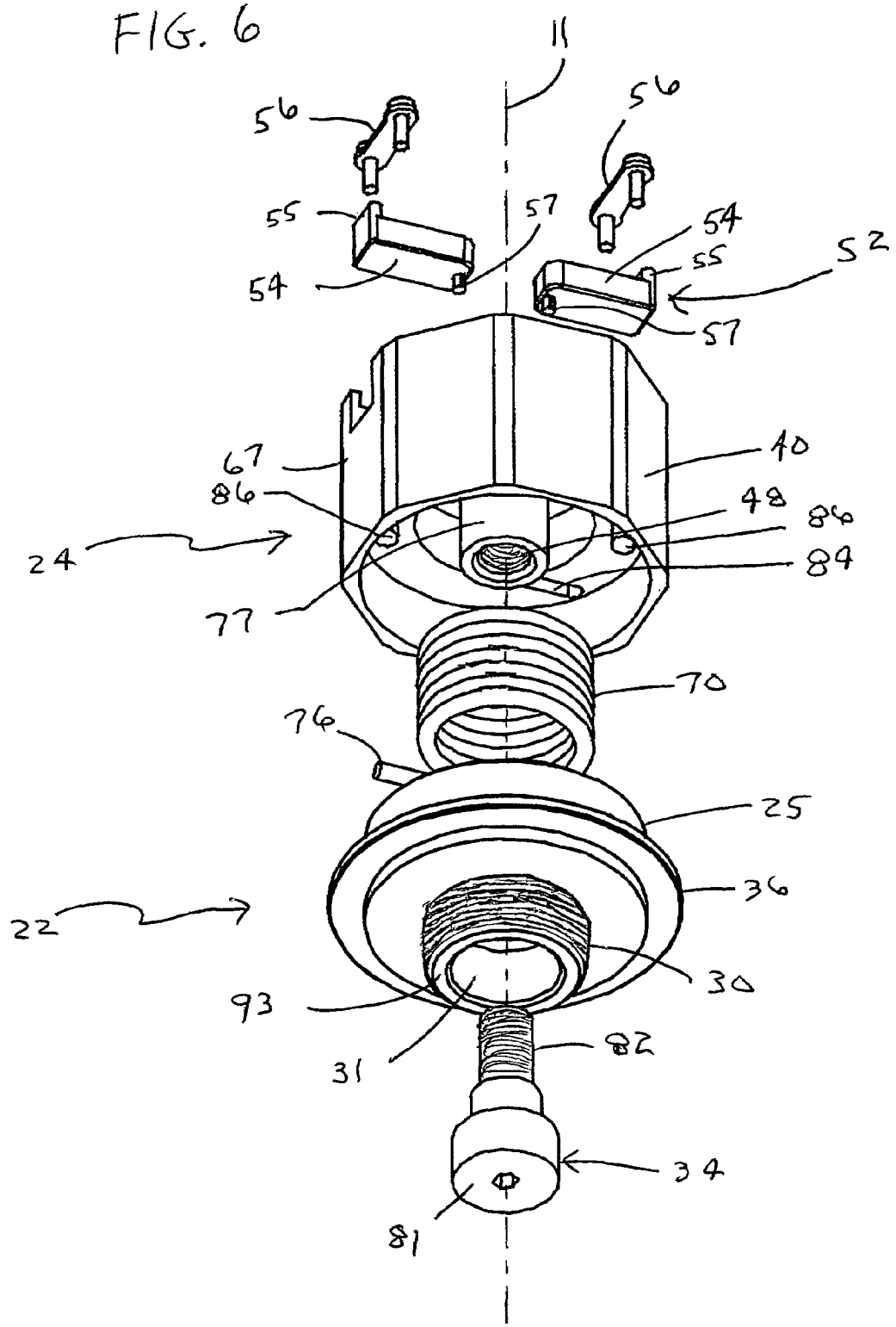

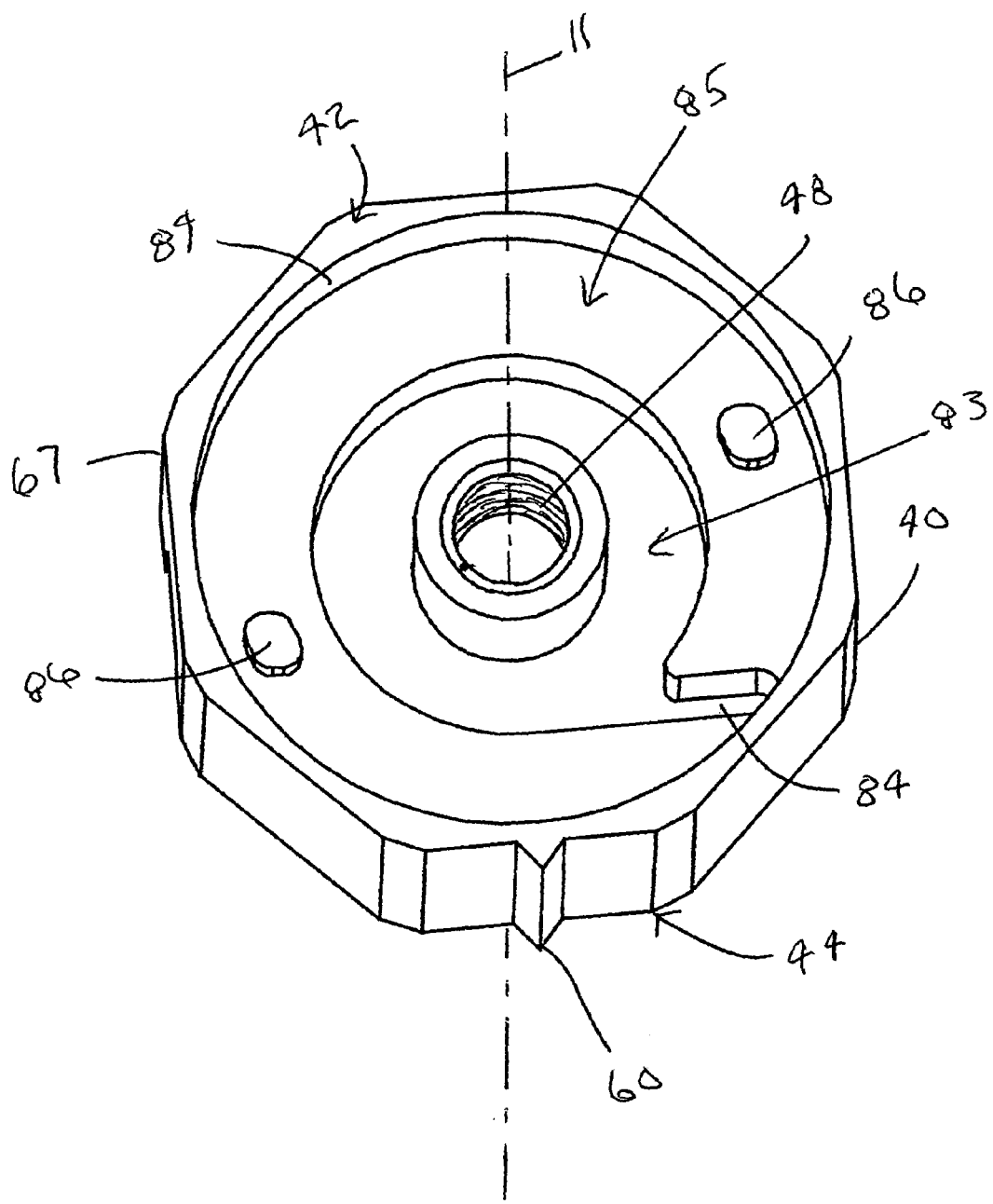

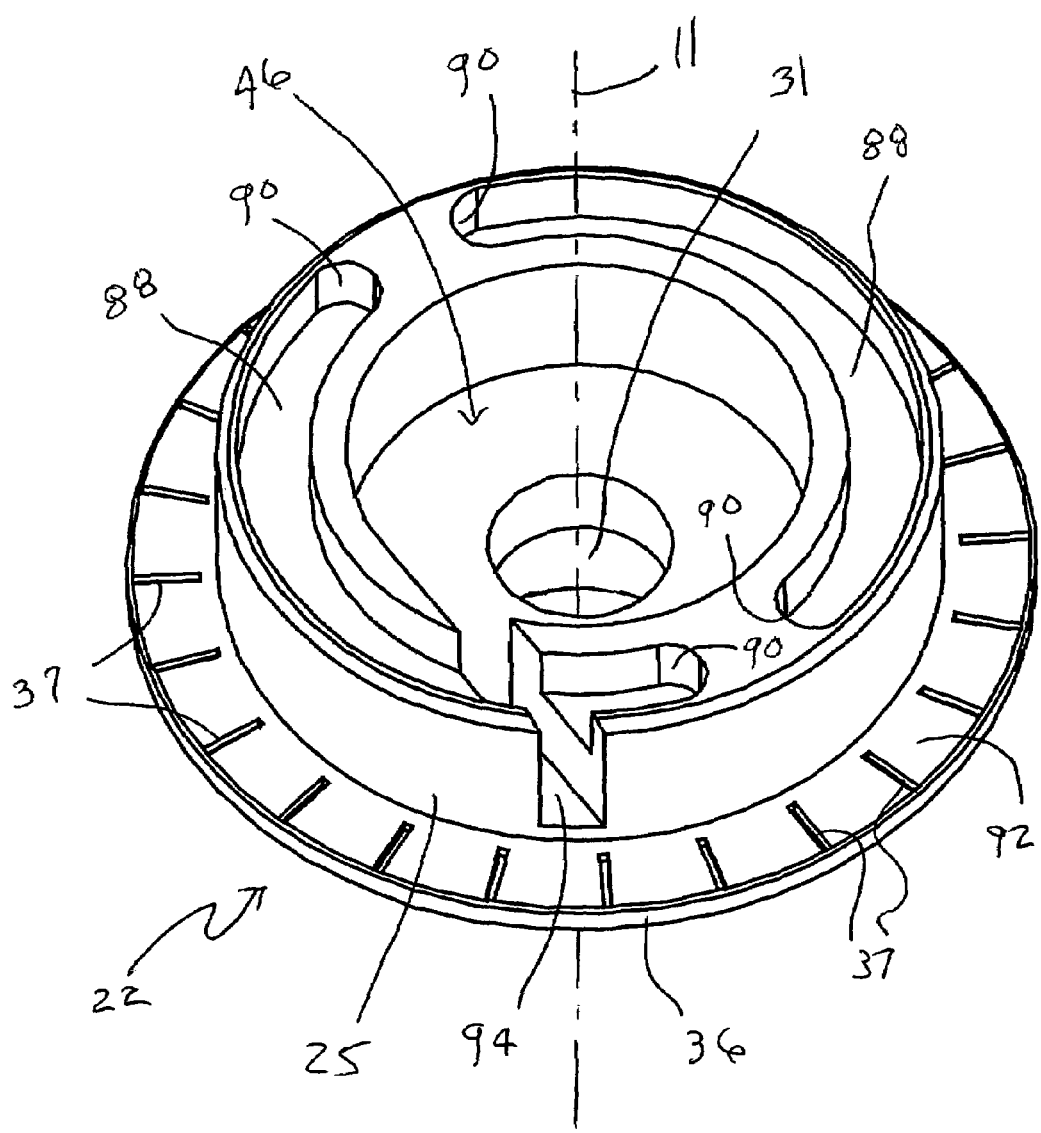

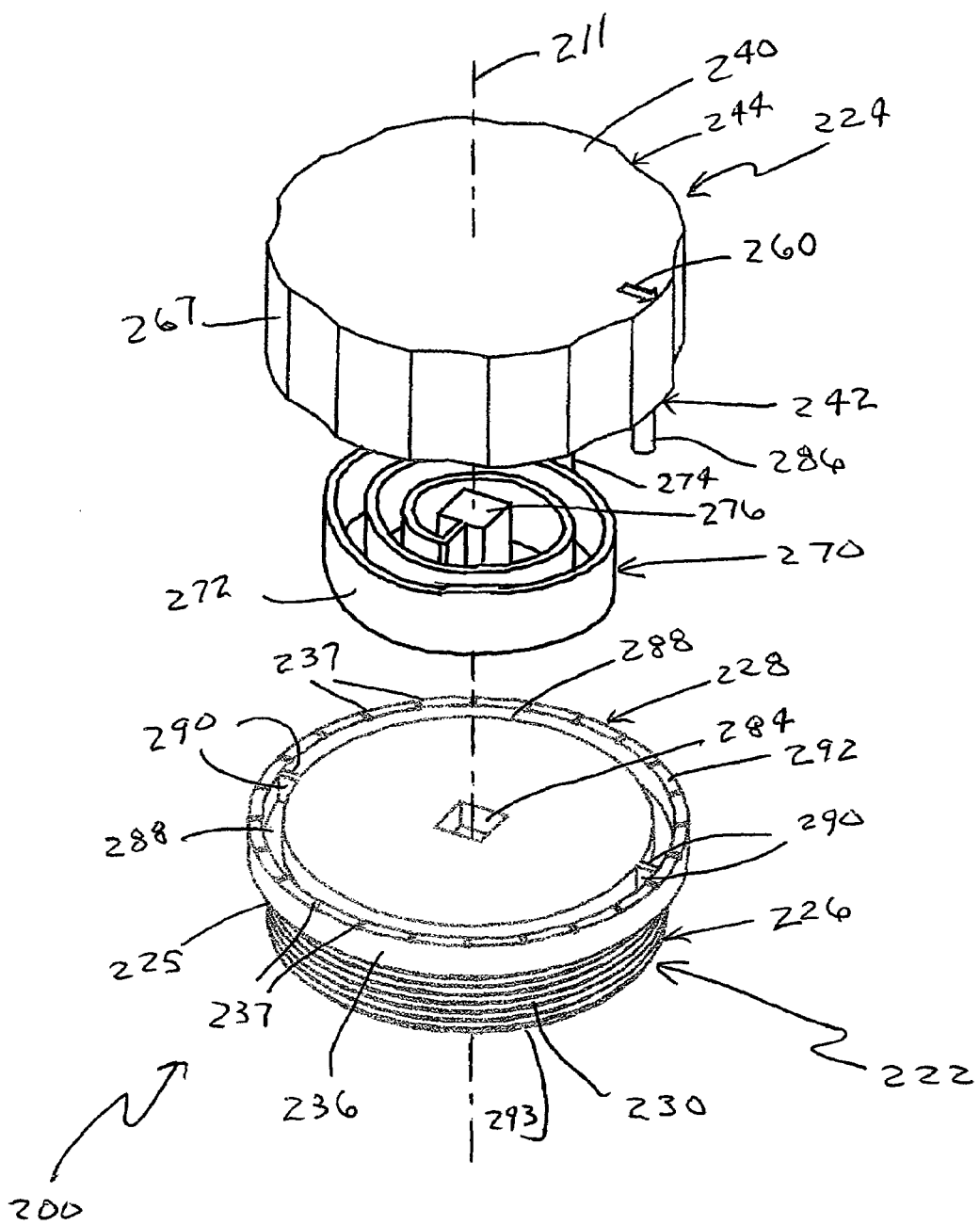

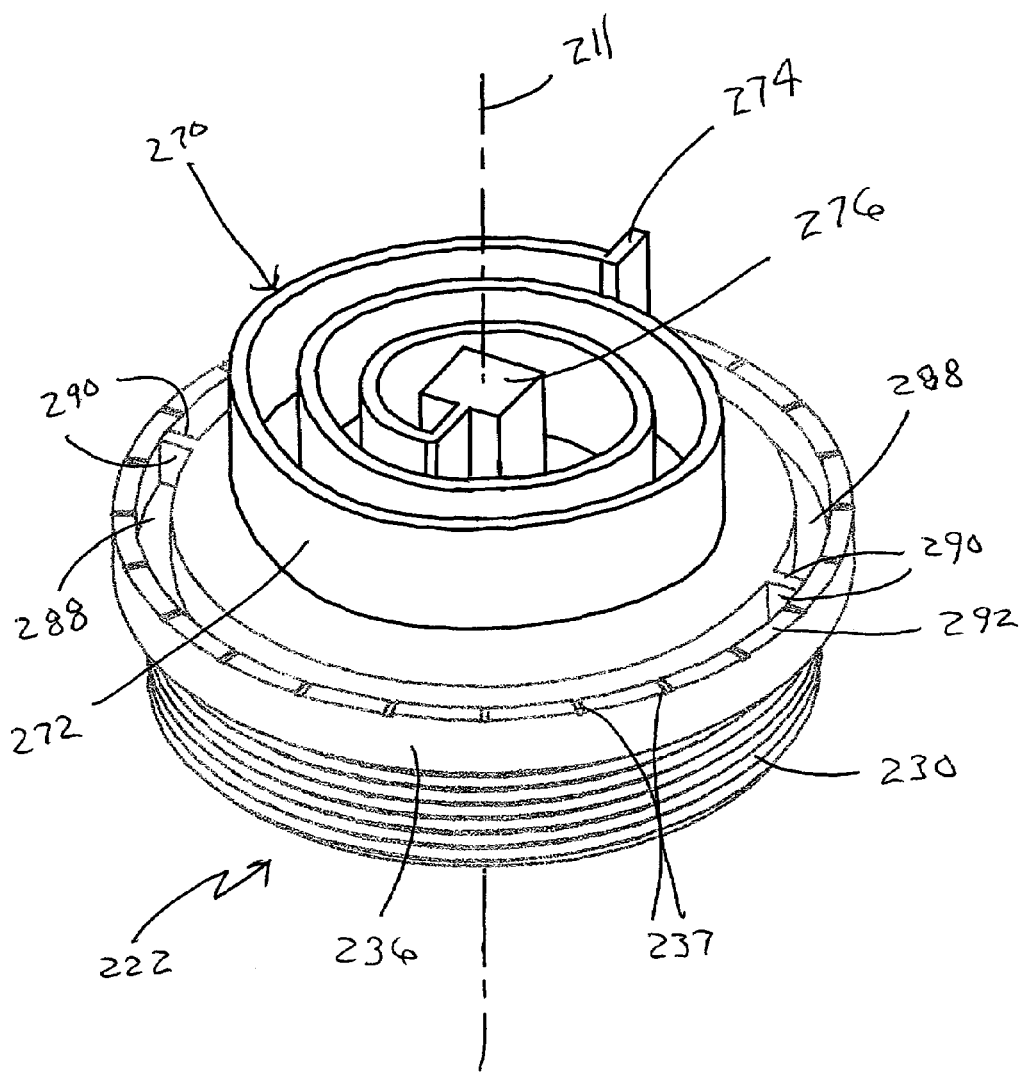

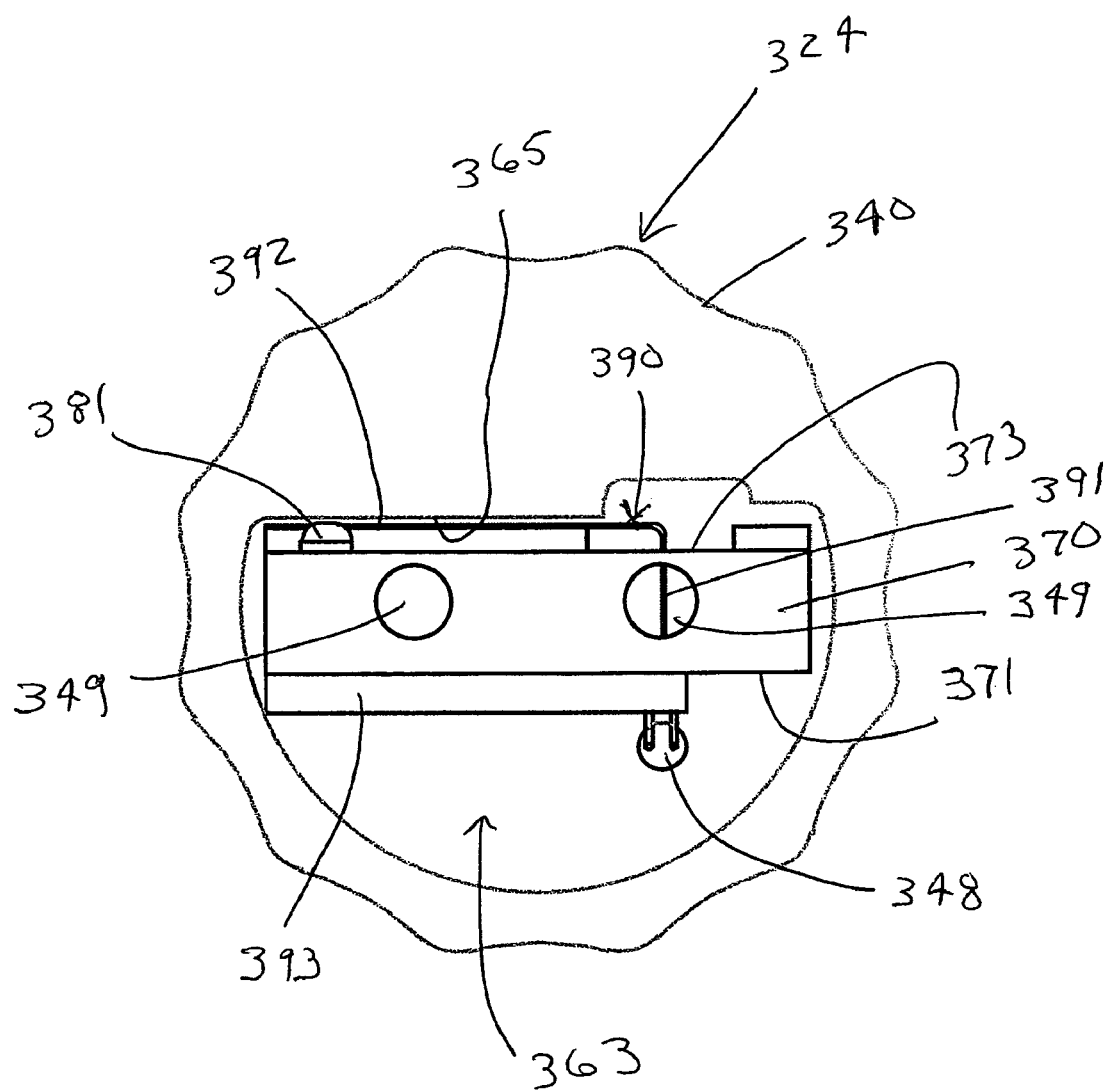

PACKAGED DEVICE ADAPTER WITH TORQUE INDICATING ASSEMBLY

BACKGROUND OF THE INVENTION

The present invention relates to electrical adapters and methods using such adapters. More particularly, the present invention pertains to employing a torque indicating apparatus with adapters for packaged integrated circuit devices (e.g., micro lead frame packages, micro lead chip carriers, quad flat no lead packages, and micro ball grid array packages, etc.) and methods for using such adapters.

Certain types of integrated circuit packages are becoming increasingly popular due to their occupancy area efficiency. In other words, they occupy less area on a target board on which they are mounted while providing a high density of contact terminals. For example, one such high density package type is a micro lead frame package. Generally, such packages contain an integrated circuit having its die bond pads electrically connected to respective conductive contact lead elements (e.g., lands) that are distributed on a surface of the package (e.g., the bottom surface of the package, for example, in an array).

A target printed circuit board upon which the package is to be mounted typically has formed on its surface a corresponding array of conductive pads which are aligned with the conductive contact lead elements of the package for electrically mounting the package on the target board. The target board typically includes other conductive traces and elements which lead from the array of conductive pads used for mounting the package to other circuitry on the board for connecting various components mounted thereon.

Typically, to mount such a package to a target board, solder material (e.g., solder balls) is provided in a manner corresponding to the array of conductive pads on the target board. The package is positioned with the contact lead elements in contact with the solder material corresponding to the array of conductive pads on the target board. The resulting structure is then heated until the solder material is melted and fused to the contact lead elements of the package.

Such area efficient packaging, e.g., micro lead frame packages or micro ball grid array packages, provide a high density of terminals at a very low cost. Also, this packaging provides for limited lead lengths. The limited lead lengths may reduce the risk of damage to such leads of the package, may provide for higher speed product, etc.

Generally, circuit boards and/or components mounted thereon are tested by designers as the circuit boards are being developed. For example, for a designer to test a circuit board and/or a package mounted thereon, the designer must first electrically connect the package to the target circuit board (e.g., using solder balls).

As described above, this may include mounting the package on the target board and heating the solder material (e.g., solder spheres) to fuse the solder material to the contact lead elements of the package. Therefore, the package may be prevented from being used again. It is desirable for various reasons to use packaged device adapters for mounting the packages and reuse such packages after testing. For example, such device packages may be relatively expensive. Further, for example, once attached, the solder material and/or the contact lead elements (e.g., land pads) are not accessible for testing. In addition, it is often difficult to rework the circuit board with the packages soldered thereon.

Various adapters are available for use in electrically connecting a package to a target board for one or more purposes. For example, U.S. Pat. No. 6,533,589 to Palaniappa et al., entitled "Packaged Device Adapter Assembly," issued 18 Mar. 2003; U.S. Pat. No. 6,394,820 to Palaniappa et al., entitled "Packaged Device Adapter Assembly And Mounting Apparatus," issued 28 May 2002; U.S. Pat. No. 5,791,914 to Loranger et al., entitled "Electrical Socket With Floating Guide Plate," issued 11 Aug. 1998; U.S. Pat. No. 4,460,223 to Brown et al., entitled "Cover For Chip Carrier Socket," issued 17 Jul. 1984; U.S. Pat. No. 5,892,245 to Hilton, entitled "Ball grid Array Package Emulator," issued 6 Apr. 1999; and U.S. Pat. No. 5,730,620 to Chan et al., entitled "Method And Apparatus For Locating Electrical Circuit Members," issued 24 Mar. 1998, all describe various adaptors that are used for mounting or locating packaged devices. Many of such adaptors use mechanisms for applying force or pressure on the packaged devices such that electrical contact of the packaged device conductive pads (e.g., pads on the bottom surface of the device) to corresponding contacts (e.g., a conductive elastomer or other arrangement of conductive elements, or further target board conductive land pads) is achieved. However, the mechanisms for applying such a force, at least in many circumstances, may apply too little force leading to inadequate contact or too large a force resulting in potential damage to, for example, contacts, components of the adaptor, etc. For example, as shown in U.S. Pat. No. 6,533,589 to Palaniappa et al., a screw or actuator element is used to apply a force to a floating member which is in direct contact with the packaged device to achieve adequate contact between contact pads of the packaged device and a conductive elastomer layer. In one or more cases, the actuator element or screw may be over tightened.

SUMMARY OF THE INVENTION

The present invention provides a torque indicating assembly that, for example, may be employed with a packaged device adapter for use in mounting or locating high density integrated circuit packages (e.g., micro lead frame packages, micro lead chip carriers, quad flat no lead packages, and micro ball grid array packages, etc.).

One exemplary embodiment of an adapter apparatus according to the present invention is for use with a packaged device having a plurality of contact elements disposed on a surface thereof. The adapter apparatus includes an adapter body defining a socket cavity configured to receive a packaged device such that the plurality of contact elements of the packaged device are at least aligned with arranged conductive elements corresponding thereto. The adapter body includes a threaded opening. The adapter apparatus further includes a torque indicating assembly for use in applying a force upon a packaged device received in the socket cavity of the adapter body. The torque indicating assembly includes a threaded interface member including a threaded portion configured to mate with the threaded opening of the adapter body and a torque applicator coupled to the threaded interface member such that torque applied to the torque applicator is transferred to the threaded interface member to move the threaded portion thereof into the threaded opening of the adapter body. The torque indicating assembly further includes a torque indicator representative of the torque being applied to the threaded interface member.

In one embodiment of the adapter apparatus, the torque applicator is coupled to the threaded interface member using a torsion element (e.g., a torsion spring or a spiral spring). For example, the torque applicator may be coupled to the threaded interface member such that when no torque is applied to the torque applicator the torsion element is in a normal state, when torque is being applied to the threaded interface member the torque indicator (e.g., one or more graduation marks provided on a portion of the threaded interface member and a pointing indicator provided on the torque applicator) is indicative of the torque being applied, and when the threaded interface member is released after torque has been applied the torsion element returns to the normal state.

In another embodiment of the adapter apparatus, the torque applicator is coupled to the threaded interface member using one or more sensor components such that when torque is being applied to the threaded interface member the one or more sensor components (e.g., a pressure sensing element) are used to detect the torque applied and provide a signal indicative thereof. For example, in such a configuration, the torque indicator may include a user indication element (e.g., a light emitting diode) operated based on the torque detected by the one or more sensor components.

In another embodiment, the adapter body defining a socket cavity therein configured to receive a packaged device may include a socket base defining the socket cavity therein configured to receive a packaged device and a socket lid to close the socket cavity hinged to the socket base. For example, the socket lid may include the threaded opening for mating with the threaded portion of the threaded interface member. Further, in such a configuration, a compression plate may be coupled to the socket lid such that a force applied by the torque indicating assembly upon a packaged device received in the socket cavity is applied via the compression plate positioned between the threaded portion of the threaded interface member and a packaged device received in the socket cavity.

Yet further in another embodiment, the threaded interface member may include a cylindrical body portion extending along an axis of the torque indicating assembly from a first end region to a second end region; the first end region for use in interfacing directly or indirectly with a packaged device received in the socket cavity and the second end region including one or more coupling elements for use in coupling the torque applicator thereto. For example, the torque applicator may include a cover structure that defines a radial cavity about the axis of the torque indicating assembly extending between a first end region and a second end region of the torque indicator; the cover structure may include one or more coupling elements. A torsion element may be engaged with at least one of the coupling elements at the second end region of the threaded interface member and at least one of the coupling elements of the cover structure for use in coupling the threaded interface member and the torque applicator. Further, for example, the torque applicator may include a handle for use in applying torque.

A method of loading a packaged device in an adapter apparatus according to the present invention is also described. The method includes providing an adapter body defining a socket cavity therein configured to receive a packaged device (i.e., the adapter body includes a threaded opening). A torque indicating assembly for use in applying a force upon a packaged device received in the socket cavity of the adapter body is also provided. The torque indicating assembly includes a threaded interface member including a threaded portion configured to mate with the threaded opening of the adapter body and, also a torque applicator coupled to the threaded interface member such that torque applied to the torque applicator is transferred to the threaded interface member to move the threaded portion thereof into the threaded opening of the adapter body. The torque indicating assembly further includes a torque indicator representative of torque being applied to the threaded interface member. The method further includes positioning a packaged device in the socket cavity such that the plurality of contact elements of the packaged device are at least aligned with arranged conductive elements corresponding thereto and inserting the threaded portion of the threaded interface member into the threaded opening of the adapter body. The torque applicator of the torque indicating assembly is then turned for use in applying a force on the packaged device positioned in the socket cavity such that the plurality of contact elements of the packaged device are in electrical contact with the arranged conductive elements corresponding thereto. The threaded interface member is turned into the threaded opening of the adapter body as the torque applicator is turned. An indication using the torque indicator is then provided that is representative of the force applied to the packaged device.

In one embodiment of the method, providing the adapter body defining a socket cavity therein configured to receive a packaged device may include providing a socket base defining the socket cavity therein configured to receive a packaged device and a socket lid hinged to the socket base to close the socket cavity (i.e., the socket lid may include the threaded opening defined for mating with the threaded portion of the threaded interface member). Further, positioning a packaged device in the socket cavity may include opening the socket lid and positioning a packaged device in the socket cavity such that the plurality of contact elements of the packaged device are at least aligned with arranged conductive elements corresponding thereto and closing and latching the socket lid to the socket base.

In another embodiment of the method, the torque applicator may be coupled to the threaded interface member using a torsion element and/or the torque indicator may include one or more graduation marks provided on a portion of the threaded interface member and a pointing indicator provided on the torque applicator.

In another embodiment of the method, the torque applicator may be coupled to the threaded interface member using one or more sensor components such that when torque is being applied to the threaded interface member the one or more sensor components are used to detect the torque applied and provide a signal indicative thereof, and/or the torque indicator may include a user indication element (e.g., a light emitting diode) operated based on the torque detected by the one or more sensor components.

In yet another embodiment of the method, providing an indication using the torque indicator representative of the force applied to the packaged device may include activating an indicator when a predetermined force is reached and/or providing a graduated indication of the force being applied.

Another exemplary embodiment of an adapter apparatus for use with a packaged device having a plurality of contact elements disposed on a surface thereof is described herein. The adapter apparatus includes an adapter body defining a socket cavity configured to receive a packaged device such that the plurality of contact elements of the packaged device are at least aligned with arranged conductive elements corresponding thereto. The adapter body includes a threaded opening. The adapter apparatus further includes a torque indicating assembly for use in applying a force upon a packaged device received in the socket cavity of the adapter body. The torque indicating assembly includes a threaded interface member that includes a threaded portion configured to mate with the threaded opening of the adapter body (e.g., the threaded portion of the threaded interface member is turned into the threaded opening of the adapter body) to apply a force, either directly or indirectly, to a packaged device received in the socket cavity and a torque indicator representative of the force applied to the packaged device.

In one embodiment of the adapter apparatus, the adapter apparatus further includes a torque applicator coupled to the threaded interface member (e.g., coupled using a torsion element or using one or more sensor components) such that torque applied to the torque applicator is transferred to the threaded interface member to move the threaded portion thereof into the threaded opening of the adapter body.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

BRIEF DESCRIPTION OF THE DRAWINGS

FIG. 3 is a perspective view of the exemplary packaged device adapter apparatus shown in FIGS. 1 and 2 with the torque indicating assembly being exploded from other portions of the adapter apparatus.

FIG. 4 is perspective diagrammatic cross-section view of the exemplary torque indicating assembly shown in FIGS. 1-3 taken along line 4-4 in FIG. 3 that may be used with the packaged device adapter apparatus such as that shown in FIGS. 1-4 but also with any number of different adapters having a threaded opening configured for operation with the torque indicating assembly.

FIGS. 5 and 6 are exploded perspective views of the torque indicating assembly shown in FIGS. 1-4.

FIG. 7 is a more detailed perspective view of one embodiment of a portion of an exemplary torque applicator for use in a torque indicating assembly such as that shown in FIGS. 1-6.

FIG. 8 is a more detailed perspective view of one embodiment of a portion of an exemplary threaded interface member for use in a torque indicating assembly such as that shown in FIGS. 1-6.

FIG. 9B is an exploded perspective view of the torque indicating assembly shown in FIG. 9A.

FIG. 9C is a more detailed perspective view of one embodiment of a portion of an exemplary threaded interface member for use in a torque indicating assembly such as that shown in FIGS. 9A-9B along with a spiral spring used therewith.

FIG. 10D is a bottom view of a portion of an exemplary torque applicator for use in a torque indicating assembly such as that shown in FIGS. 10A-10D.

DETAILED DESCRIPTION OF THE EMBODIMENTS

Generally, a packaged device adaptor apparatus for use with packaged devices (e.g., high density devices) which employs a torque indicating assembly shall be described herein. An illustrative packaged device adaptor apparatus 10 using a torque indicating assembly according to the present invention shall be described with reference to FIGS. 1-3. Various illustrative embodiments of multiple configurations of the torque indicating assembly shall further be respectively described in more detail with reference to FIGS. 4-8, FIGS. 9A-9C, and FIGS. 10A-10D.

One skilled in the art will recognize from the description herein that the various illustrative embodiments described include some features or elements included in other illustrative embodiments and/or exclude other features. However, packaged device adaptor apparatus according to the present invention may include any combination of elements selected from one or more of the various embodiments as described herein with reference to FIGS. 1-10. For example, as will be readily apparent from the description below, one or more different types of socket bodies, including, for example, a clamshell socket, may utilize the torque indicating assembly described herein. Further, for example, a handle described in combination with one embodiment may be used in a different embodiment. Yet further, for example, as described herein, various torque indicators for showing the user of the assembly the amount of torque being applied, or showing the user when a predetermined amount of torque is applied, may be provided in various manners. One skilled in the art will readily recognize that an adaptor apparatus employed for one or more various purposes (e.g., locating a packaged device on a target board, mounting a packaged device for testing purposes relative to a target board, etc.) may benefit from the features described herein.

Figure 1:
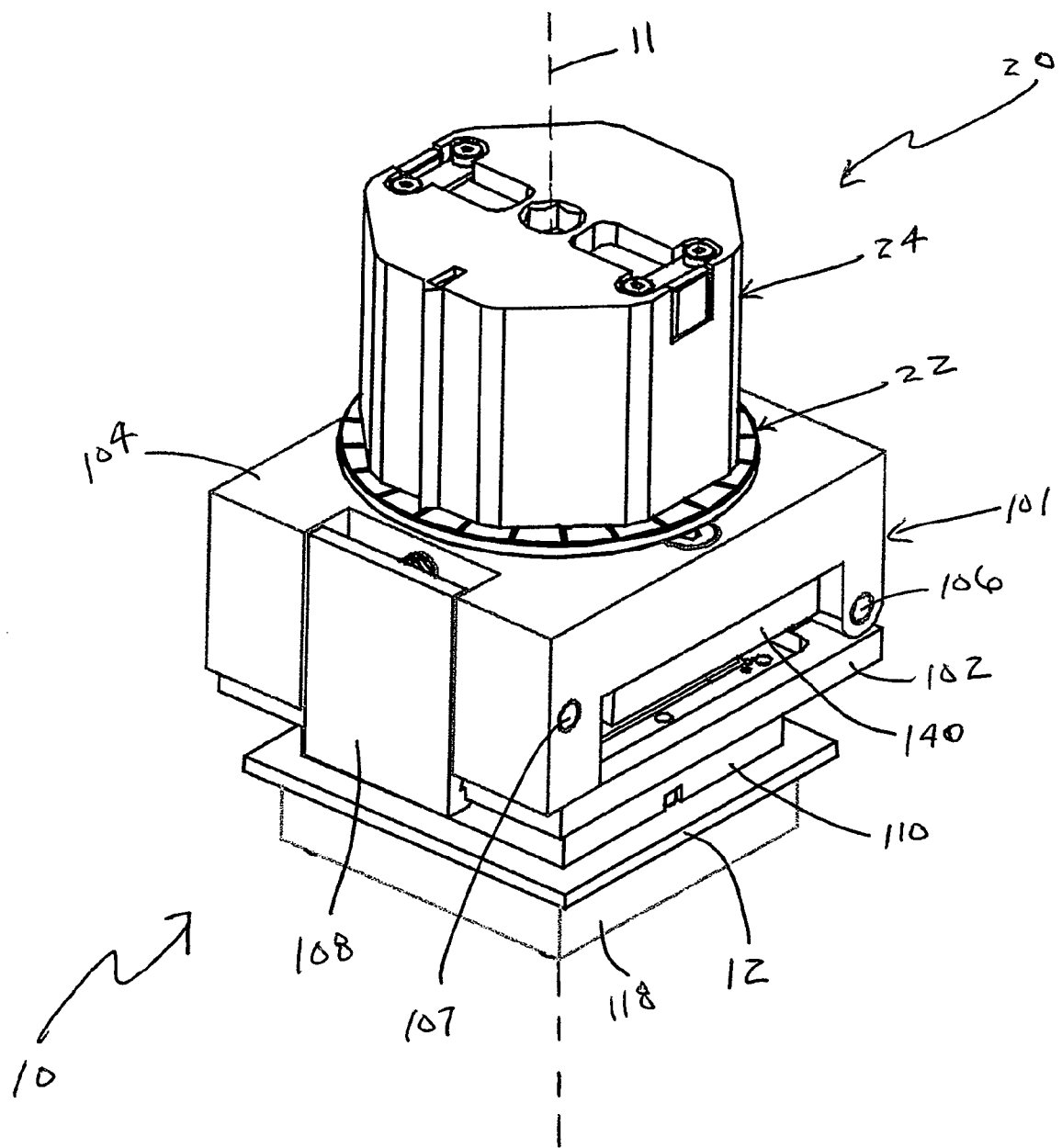
FIG. 1 is a perspective view of an exemplary packaged device adapter apparatus including a torque indicating assembly according to the present invention mounted relative to a target board.
Figure 2:
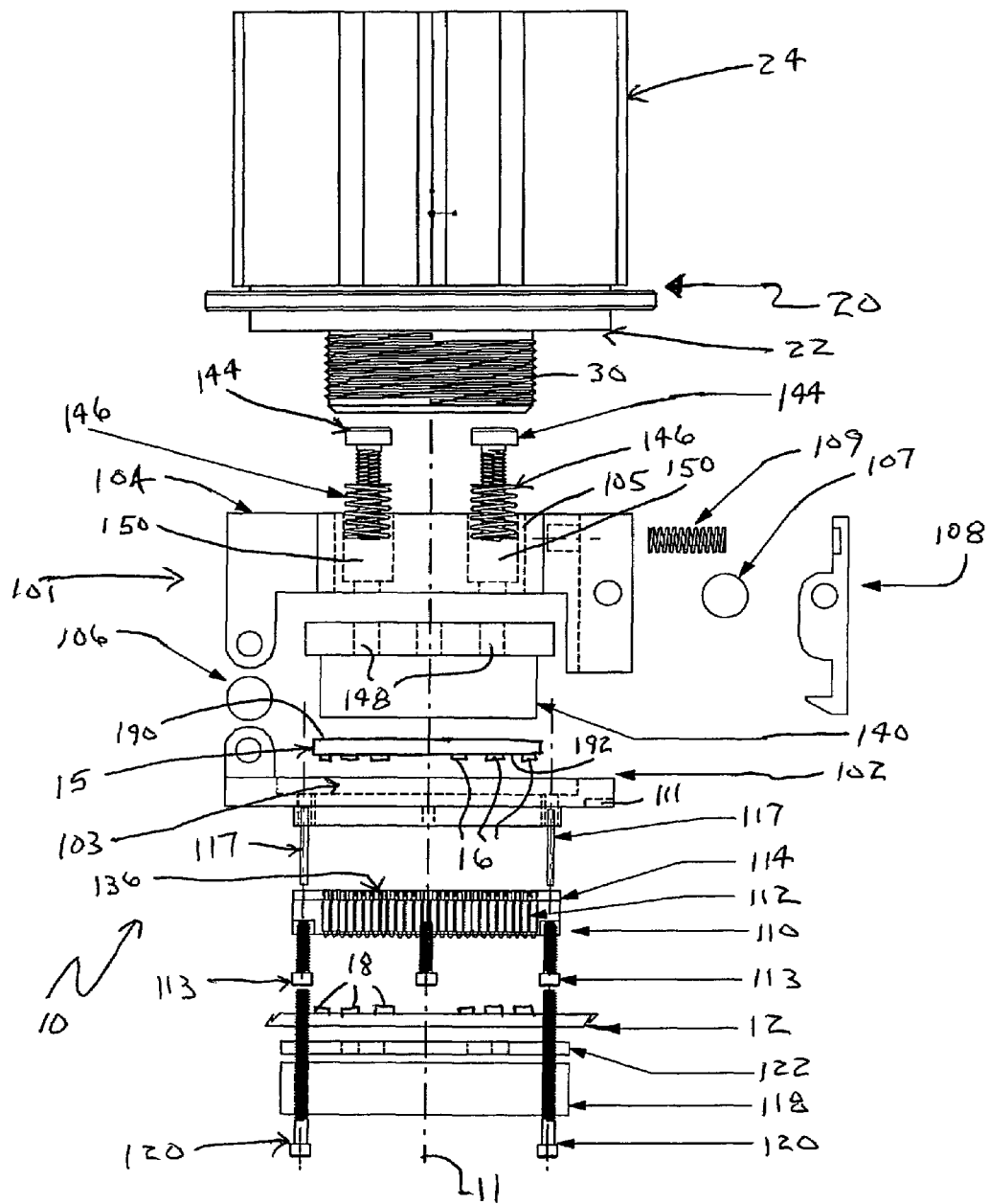
FIG. 2 is a side exploded view of the exemplary packaged device adapter apparatus of FIG. 1.

FIG. 1 is a perspective view of an exemplary packaged device adaptor apparatus 10 including a torque indicating assembly 20 according to the present invention. The exemplary packaged device adaptor apparatus 10 is mounted relative to a target board 12. A side exploded view of the exemplary packaged device adaptor apparatus 10 is shown in FIG. 2. Further, FIG. 3 shows an exploded perspective view of the torque indicating assembly away from other portions of the exemplary packaged device adaptor apparatus of FIGS. 1-2.

The adaptor apparatus 10 is for use with a packaged device 15 (see FIG. 2) having a plurality of contact elements 16 disposed on a surface 192 (e.g., bottom surface) thereof. The adaptor apparatus 10 includes an adaptor body 101 defining a socket cavity 103 (see FIG. 2) configured to receive the packaged device 15 such that the plurality of contact elements 16 of the packaged device 15 are at least aligned with arranged conductive elements. For example, the conductive elements may include conductive elements 136 as shown in FIG. 2 which form a portion of adaptor apparatus 10. However, the conductive elements may include other elements in one or more other applications as will be apparent from the description herein, such as, for example, an arranged pattern of contacts 18 on a surface of a target board 12 (see FIG. 2). The adaptor body 101 further includes a threaded opening 105.

The torque indicating assembly 20 is provided for use in applying a force upon the packaged device 15 received in the socket cavity 103 defined by the adaptor body 101. Generally, the torque indicating assembly 20 includes a threaded interface member 22; the threaded interface member 22 including a threaded portion 30 configured to mate with the threaded opening 105 of the adaptor body 101. Further, at least in one embodiment, the torque indicating assembly 20 includes a torque applicator 24 and a torque indicator (e.g., graduation marks 37 and pointer 60) further described herein with reference to FIGS. 4-8.

In one embodiment, the torque applicator 24 is coupled to the threaded interface member 22 such that torque applied to the torque applicator 24 is transferred to the threaded interface member 22 to move the threaded portion 30 thereof into the threaded opening 105 of the adapter body 101. Turning of the torque indicating assembly 20 into the threaded opening 105 asserts a force (e.g., either directly or indirectly) onto packaged device 15 such as, for example, to provide the contact elements 16 of the packaged device 15 into electrical contact with an arrangement of conductive elements (e.g., conductive pin elements 136) corresponding thereto. The torque indicator (e.g., graduation marks 37 and pointer 60) provides an indication representative of the torque being applied to the threaded interface member 22 (e.g., the force being applied to the packaged device 15), and/or in other embodiments when a predetermined torque or force has been applied. This allows a user to be cognizant of the force being applied to the packaged device 15 (e.g., either direct or indirectly) via the threaded interface member 22, and to take any action desired (e.g., stop turning to prevent excessive force from being applied). In other words, in at least one embodiment, the torque indicator provides, for example, a visual indication to the user so that the user stops applying torque to the torque applicator 24. However, one will recognize that various types of indicators may be used to provide such notice to the user, including but not limited to visual (e.g., graduation marks and pointers, light emitting diodes, etc.) and/or auditory indications (e.g., buzzer, beep, etc.).

The components of the adaptor apparatus 10, including the torque indicating assembly 20, lie along axis 11. Preferably, the torque indicating assembly 20 is a cylindrical-like assembly that extends along the axis 11 that turns into the threaded opening 105. The axis 11 is generally orthogonal, at least in one embodiment, to the target board 12.

The torque indicating assembly 20 according to the present invention provides an adaptor apparatus 10 (e.g., one or more different configurations of such an adaptor apparatus that includes a threaded opening for mating with such a torque indicating assembly) the ability to provide an indication to a user of the amount of force applied to a packaged device 15 when mounted within the adaptor body 101. As such, the packaged device 15 will not be over-compressed. Various problems resulting from overcompression can thus be prevented. For example, such overcompression may reduce the life of various contacts of the packaged device 15 or various conductive elements of the adaptor apparatus 10. As such, with use of the torque indicating assembly, these contacts and conductive elements will last longer. Further, for example, over-compression may damage the target board 12 as well.

The packaged device 15 may be any packaged device having a plurality of contact elements 16 disposed on a surface thereof. In one exemplary embodiment, the packaged device is a device having a high density of contact terminals (e.g., lands, solder spheres, bumps, contact pads, leads, etc.) disposed on the surface thereof. For example, the high density packaged device may be a micro lead frame package, a micro lead chip carrier, a quad flat no-lead package, micro ball grid array package, or any other type of package such as a ball grid array package, a chip scale package, a flip chip package, a flat package, a quad flat package, a small outline package, a land grid array package, or any other package having contact elements disposed on a surface thereof. Although one packaged device 15 is shown in the figures, the present invention is in no manner limited to the use of the illustrative adaptor apparatus embodiments described herein with packages that are configured in such a manner. Rather, adaptor apparatus which employ torque indicating assemblies according to the present invention and as described herein may be used with any packaged device having contact elements disposed on a surface thereof.

In one embodiment, as shown in FIG. 2, packaged device 15 includes an upper surface 190 and a lower surface 192, in addition to one or more side surfaces extending therebetween at the perimeter of the packaged device 15. The plurality of contact elements 16 are disposed at least at the lower surface 192. For example, the contact elements 16 may be distributed in an array along orthogonal X and Y axes, or the contact elements (e.g., lands) may be distributed along the outer portions of the lower surface 192 proximate the perimeter thereof. However, any arrangement of contact elements 16 may be accommodated according to the present invention.

The adaptor body 101 may be provided by any number of components that define the socket cavity 103 configured to receive the packaged device 15 therein. Preferably, the packaged device is received within the socket cavity 103 such that the plurality of contact elements 16 of the packaged device 15 are at least aligned with arranged conductive elements corresponding thereto (e.g., pads of a target board, conductive elastomer elements, etc.). Further, the adaptor body 101 must include the threaded opening 105. Apart from being operable to receive the packaged device 15 and including a threaded opening 105, the configuration of the adaptor body 101 may take any number of forms. For example, the adaptor body may include elements such as those found in U.S. Pat. Nos. 6,533, 589, 6,394,820, 5,791,914, 4,460,223, 5,892,245, and/or 5,730,620. For example, such adaptor bodies may be configured for receiving a packaged device 15 to be located or aligned with contact pads on a target board, may be configured for receiving a packaged device such that the contact elements 16 thereof are positioned adjacent a conductive elastomer, or may include, for example, a clamshell socket body as shown and described generally herein with reference to FIGS. 1-3.

Although the torque indicating apparatus 20 is described herein particularly with reference to use with a clamshell socket defining a socket cavity 103, as shown in FIGS. 1-3 and as is apparent from the description herein, the torque indicating assembly 20 may be used with any other adaptor apparatus. Further, for example, the torque indicating assembly 20 may be used in one or more other applications where a threaded opening 105 is provided. Such applications need not be applicable to the area of mounting or, for example, locating packaged devices.

As shown in FIGS. 1-3, the adaptor body 101 (e.g., a clamshell socket) includes a socket base 102 defining the socket cavity 103 therein configured to receive a packaged device 15. The adaptor body 101 further includes a socket lid 104 used to close the socket cavity 103 that is hinged to the socket base 101 using a hinge pin or pins 106. The socket lid 104 includes the threaded opening 105 for mating with the threaded portion 30 of the threaded interface member 22.

Further, as shown in FIGS. 1-3, the adaptor body 101 may include a latch mechanism for latching the lid 104 to the socket base 102. In one embodiment, the latch mechanism includes a latch element 108 connected to the socket lid 104 using a latch spring 109 and a hinge pin and snap ring 107. The latch element 108 engages the socket base 102 at indent 111 achieving a closed and latched state.

The exemplary adaptor shown in FIGS. 1-3 further includes various components. For example, the adaptor apparatus 10 includes a structure 112 for providing an arrangement of pins 136 (e.g., pogo pins) corresponding to the plurality of contact elements 16 of the packaged device 15 to which they are to be electrically connected. A pin and ball guide top layer 114 is provided to guide the packaged device 15 and align the packaged device 15 to the arranged conductive elements 136 (e.g., pins) along with a guide bottom layer 110 for receiving the conductive elements or pins 136 and holding the pins 136 in a particular configuration. Pin guide screws 113 are provided for holding the arrangement of conductive elements 136 in position, and dowel pins 117 are provided for the socket base 102 to align the pin containing structure 112 relative thereto. Further, an insulation plate 122, a backing plate 118, and socket base screws 120 are provided for mounting the adaptor body 101 relative to the target board 12 (e.g., a printed circuit board).

As previously described herein, the components forming the adaptor body 101 may take one of various different forms, and any particular listing and/or provision of description herein with respect to a particular adaptor body is not to be construed as limiting to the present invention. Further, for example, the arrangement of conductive elements to which the contact elements 16 of the packaged device are aligned and provided in electrical contact with by use of the torque indicating assembly 20, according to the present invention, may take one of various different types or forms. For example, the arrangement of conductive elements may be provided by a conductive elastomer layer, a pin arrangement structure, a socket arrangement structure, or any other arrangement of conductive elements as would be known to one skilled in the art.

Further, in one embodiment of the present invention, a compression plate 140 is provided for transferring the force from the threaded interface member 22 to the packaged device 15. However, such force may be applied directly from the threaded interface member 22 to the packaged device 15. In one or more embodiments, the compression plate 140 may provide for a more distributed force on the packaged device 15, and thus be advantageous.

The compression plate 140 may either be a floating compression plate upon which the threaded interface member 22 makes contact, or the compression plate 140 may be movably coupled to the socket lid 104 or any other component of the adaptor body 101. For example, as shown in FIGS. 1-3, the compression plate 140 includes threaded openings 148 for mating with clamshell screws 144 inserted within openings 150 of clamshell lid 104 to mount the compression plate 140 relative to the socket lid 104. Clamshell screw springs 146 allow for the effective transmission of force from the threaded interface member 22 to the compression plate 140 when the compression plate 140 is mounted to the socket lid 104.

FIG. 4 is perspective diagrammatic cross-section view of the exemplary torque indicating assembly 20 shown in FIGS. 1-3 taken along line 4-4 in FIG. 3 that may be used in a packaged device adapter apparatus 10 such as that shown in FIGS. 1-4 but also with any number of different adapters having a threaded opening configured for operation with the torque indicating assembly 20. The torque indicating assembly 20 for use in applying a force (e.g., directly or indirectly) upon the packaged device 15 received in the socket cavity 103 of the adapter body 101 includes the threaded interface member 22 including the threaded portion 30 configured to mate with the threaded opening 105 of the adapter body 101 and the torque applicator 24 coupled to the threaded interface member 22 such that torque applied to the torque applicator 24 is transferred to the threaded interface member 22 to move the threaded portion 30 thereof into the threaded opening 105 of the adapter body 101.

The torque applicator 24 is coupled to the threaded interface member 22 using a torsion element 70 (e.g., a torsion spring). For example, the torque applicator 24 is coupled to the threaded interface member 22 such that when no torque is applied to the torque applicator 24 the torsion element 70 is in a normal state. When torque is being applied to the threaded interface member 22 via the torque applicator 24, the torque indicator (e.g., one or more graduation 37 marks provided on a portion of the threaded interface member 22 and a pointing indicator 60 provided on the torque applicator 24) is indicative of the torque being applied. When the threaded interface member 22 is released after torque has been applied, the torsion element 70 returns to the normal state such as shown in FIG. 4.

FIGS. 5 and 6 are exploded perspective views of the torque indicating assembly 20 shown in FIG. 4. FIG. 7 is a more detailed bottom perspective view of a portion of the torque applicator 24 shown in FIGS. 4-6. FIG. 8 is a more detailed top perspective view of a portion of the threaded interface member 22 shown in FIGS. 4-6.

The threaded interface portion 22 includes a cylindrical body portion 25 extending along the axis 11 of the torque indicating assembly 20 from a first end region 26 to a second end region 28. At least a portion of the outer surface of a cylindrical body portion 25 includes the threaded portion 30 configured to mate with the threaded opening 105 of the adaptor body 101 (see FIG. 3). The first end region 26 includes the lower end surface 93 for use in interfacing directly or indirectly with a packaged device 15 received in the socket cavity 103. For example, the lower end surface 93 may interface directly with the upper surface 190 of the packaged device 15 or may interface indirectly with the packaged device 15 through use of compression plate 140. The second end region 28 of the cylindrical body portion 25 defines one or more openings for use in coupling the threaded interface member 22 to the torque applicator 24 using the torsion element, e.g., torsion spring 70.

The torsion spring 70, as shown in FIG. 5, includes a body portion 72 terminating at first leg 74 and second leg 76. As a load is applied to the torsion spring 70, the spring's diameter will decrease, reducing the outside and inside diameters of the spring body portion 72. The torsion spring 70 will grow in length. One will recognize that any configuration of torsion spring or other torsion element that fulfills the coupling function according to the present invention may be used (e.g., spiral spring as described with reference to FIGS. 9A-9C).

As shown in FIG. 8, various openings are defined by the second end region 28 of the cylindrical body portion 25. For example, radial opening 46 defined about axis 11 is configured to receive at least a portion of the body portion 72 of the torsion spring 70. Further, second leg slot 94, extending from the radial opening 46, is defined to hold or fix the second leg 76 of the torsion spring 70 in place when torque is applied to the torque applicator 24. Still further, two projection slots 88 with contact ends 90 are defined for receiving one or more projections 86 of the torque applicator 24. As shown in FIG. 8, the defined openings are of particular configurations. However, one will recognize that the size and shape of such openings, e.g., 88, 46, and 94, will depend upon the type and configuration of elements to be received therein, and the present invention is not limited to any particular configuration of elements.

The threaded interface member 22 further includes a flange portion 36 extending radially from the cylindrical body portion 25 between the first and second end regions 26 and 28 at a distance from the axis 11. The flange portion 36 includes an upper surface 92 that includes one or more graduation marks 37 thereon. The graduation marks 37 may be provided in any known manner as long as such marks are suitable for use with pointer 60 of the torque applicator 24 in providing an indication of torque being applied to the threaded interface member 22 when it is turned into opening 105 of the adapter apparatus 10.

Yet further, the threaded interface member 22 includes another radial opening 31 about axis 11 configured to receive a threaded screw 34. The threaded screw 34 includes a first threaded end portion 82 that is insertable through the radial opening 31 and into radial opening 46 for use in coupling the threaded interface member 22 within threaded opening 48 defined by the torque applicator 24. A second end portion 81 of the threaded screw 34 is configured to be retained in radial opening 31 for holding threaded interface member 22 and torque applicator 24 together when the threaded end portion 82 of the threaded screw 34 is turned into the threaded opening 48.

The torque applicator 24 that is coupled to the threaded interface member 22 by the threaded screw 34 and with use of at least the torsion spring 70 includes a cover body structure 40 extending between a first end region 42 and a second end region 44 thereof. The threaded opening 48 is defined by an axial structure 77 extending along the axis 11 at the center of the cover body structure 40 and open at the bottom of torque applicator 24 to receive the threaded screw 34.

Further, as best shown in FIG. 7, one or more openings are defined and one or more other elements are provided at the first end region 42 of the cover body structure 40. For example, radial opening 83 defined about axis 11 between axial structure 77 and a cylindrical outer surface portion 67 of the cover body structure 40 is configured to receive at least a portion of the body portion 72 of the torsion spring 70. Further, first leg slot 84, extending from the radial opening 83, is defined to hold or fix the first leg 74 of the torsion spring 70 in place when torque is applied to the torque applicator 24. Still further, two projections 86 extend towards the bottom of the torque applicator 24 at the first end region 42 to interact with the projection slots 88 of the threaded interface member 22. The projections 86 extend into another radial opening 85 extending from radial opening 83 and defined further from the axis 11 than the radial opening 83. The radial opening 85 is defined at least in part by a radial surface 89 sized and configured to be positioned about at least a portion of the cylindrical body 25 at the second end region of the threaded interface member 22.

The cover body structure 40 includes, at least in one embodiment, the cylindrical outer surface portion 67. The cylindrical outer surface portion 67 includes a pointer 60 associated therewith for use in providing an indication of the amount of torque applied to the torque indicating assembly 20 when in use with the graduation marks 37 provided on the flange 36 of the threaded interface member 22. One will recognize that any structure, marking, or other indicating element that is used to indicate the amount of torque in association with the graduation marks 37, may be referred to as a pointer. The present invention is not limited to any particular indicating structure, symbols, markings etc., but only to the provided functionality of indicating the torque being applied. Various elements, markings, configurations, etc. may be used to provide for such torque indication.

Yet further, the torque applicator 24 includes a handle 52 at the second end region 44 of the cover body structure 40 for ease turning the torque indicating assembly 20. The handle 52 is recessed in two openings 51 extending between the axis 11 and outer surface portion 67 of the cover body structure 40. Two handle members 54 are provided, respectively, in the openings 51. Each handle member 54 includes a first end projection 57 that interacts with a retaining surface 59 at the outer surface portion 67 defining the opening 51 to prevent the handle member 54 from slipping out of the opening 51. Further, each handle member 54 includes a second end projection 55 (e.g., extending in a direction opposite the first end projection 57) to cooperate with a retaining structure 56 (e.g., a clamping element) to also assist in retaining the handle member 54 in the respective opening 51.

As clearly shown in FIG. 4, with each handle member 54 located in respective openings 51, the handle members 54 can be moved outward from axis 11 in the direction of arrows 58 so as to provide suitable members for a user to grasp and turn the torque indicating assembly 20. Although one exemplary handle configuration is described herein, one skilled in the art will recognize that other suitable configurations of handles may also be used. Further, socket cavity 62 may also be used with any appropriate tool to turn the torque indicating assembly 20.

When assembled, the first leg 74 of the torsion spring 70 is positioned in the first leg slot 84 of the torque applicator 24 along with a portion of the spring body 72 within radial opening 83 thereof. Further, the second leg 76 of the torsion spring 70 is positioned in the second leg slot 94 of the threaded interface member 22 along with a portion of the spring body 72 within radial opening 46 thereof. Threaded screw 34 is used to maintain the coupling of the threaded interface member 22 with the torque applicator 24. The components are sized so that a gap 99 exists between the threaded interface member 22 and the torque applicator 24 so that a small amount of slack is provided upon turning of the torque applicator 24 relative to the threaded interface member 22 such that the appropriate surfaces are allow to contact and transfer a suitable force to the packaged device 15.

As assembled and shown in FIG. 4, the torsion spring 70 is in a normal state and the torque indicator (e.g., graduation marks 37 and pointer 60) would show that no torque is being applied. However, when torque is applied, the torsion spring 70 becomes longer and a force (f) is applied to a packaged device 15 as the threaded interface member 22 is turned into opening 105 of the adapter apparatus 10. In other words, when the torque applicator 24 is turned, the threaded interface member 22 is turned into the threaded opening 105 and, when depending on the torque applied to the applicator 24, a force is applied to the packaged device 15. As the torque applicator 24 is turned, the torque indicator (e.g., graduation marks 37 and pointer 60) would represent the amount of force corresponding to the force f being exerted on the packaged device 15 (i.e., a torque corresponding thereto). When the user sees from the torque indicator that a desired force is reached, the user no longer exerts any further torque. When release, the torsion spring 70 goes back to the normal state.

In other words, using an adaptor apparatus that includes the torque indicating assembly 20 according to one embodiment of the present invention, a packaged device 15 is positioned in socket cavity 103 of the adaptor body 101 such that the plurality of contact elements of the packaged device are at least aligned with arranged conductive elements 18 corresponding thereto. The threaded portion 30 of the threaded interface member 22 is inserted into the threaded opening 105 of the adaptor body 101. The threaded interface member 22 of the torque indicating assembly 20 is turned using, for example, the handle 52 for use in applying a force on the packaged device 15 positioned in the socket cavity 103 such that the plurality of contact elements 16 of the packaged device 15 are in electrical contact with the arranged conductive elements 18 corresponding thereto. The threaded interface member 22 is turned into the threaded opening 105 of the adaptor body 101 until the user recognizes from the torque indicator that a desired force on the packaged device 15 has been reached (e.g., a user may be given a particular graduation mark 37 that indicates when the user should stop turning).

In operation, with the packaged device 15 received within the socket cavity 103 and the lid 104 being coupled to the socket base 102 (e.g., latched), the torque indicating assembly 20 applies a torque to the packaged device 15 and the torque indicator (e.g., graduation marks 37 and pointer 60) provides an indication representative of the amount of torque being applied. As a user can discern the amount of torque being applied from the torque indicator, the user can limit the torque being applied to the packaged device 15, preventing the packaged device 15 from being overcompressed at the interface of the contact elements 16 and conductive elements 18, which provides a longer lasting life for the components.

For example, in operation, the threaded interface member 22 of the torque indicating apparatus 20 is inserted into threaded opening 105 of the socket lid 104. Using handle 52 (e.g., after being drawn out from the axis in the direction of arrows 58), the threaded interface member 22, which is coupled to the torque applicator 24 using the torsion spring 70, is turned into threaded opening 105 of socket lid 104. As the threaded interface member 22 is turned into the opening 105, the lower surface 93 of the threaded interface member 22 contacts the upper surface of the floating compression plate 140 such that the lower surface of the compression plate 140 comes in direct contact with the upper surface 190 of the packaged device 15. As the adaptor body 101 is mounted relative to the structure including conductive elements 18, effective electrical contact between the aligned contact elements 16 and the arranged conductive elements 18 is achieved.

As the torque applicator 24 continues to be turned, for example, by handle 52 of torque indicating assembly 20, additional force is applied onto packaged device 15. More specifically, with the first and second legs 74, 76 fixed in the first and second leg slots 84, 94, as the torque applicator 24 is turned in the clockwise direction, the projections 86 of the torque applicator 24 travel within the projection slots 88 of the threaded interface member 22 until they reach ends 90 of the slots. Once contact is made and further clockwise torque is applied to the torque applicator 24, the torque is transferred to the threaded interface member 22 through the torsion spring 70. When lower surface 93 of the threaded interface member 22 reaches the upper surface 190 of the packaged device 15, a force based on the torque applied to the applicator 24 is applied to the packaged device 15.

As the torque applicator 24 is continued to be turned in the clockwise direction and force is applied to the packaged device 15, the torque applicator 24 will begin to move clockwise relative to the threaded interface member 22. As such, the pointer 60 of the torque applicator 24 will move relative to the graduation marks 37 on flange 36 of the threaded interface member 22 to show the amount of torque being applied (e.g., representative of the force applied to the packaged device 15). The user can then stop applying torque when desired (e.g., a certain mark of the graduation marks may indicate the desired torque to be applied). When the user releases the torque applicator 24, the torsion spring 70 returns to normal state (e.g., back to a normal inner and outer diameter). Upon release, the threaded portion 30 of the threaded interface member 22 remains in the same position in the threaded opening 105, and only the torsion spring 70 (and as such the torque applicator 24) returns to their original start position (e.g., the pointer returns to its original position relative to the graduation marks) as no torque is being transferred to the threaded interface member 22 after release.

To turn the threaded interface member 22 out of the threaded opening 105, the torque applicator 24 is turned in the counterclockwise direction. In such a manner, the projections 86 will travel in the slots 88 in the opposite direction and make contact with the other ends 90 of the projection slots 88. Continuing to turn in the counterclockwise direction will engage the torque applicator 24 with the threaded interface member 22 and unscrew the threaded interface member 22 from the threaded opening 105.

As one skilled in the art will recognize, torsion elements other than the torsion spring 70 may be used according to the present invention. For example, as shown in FIGS. 9A-9B a torque indicating assembly 200 is shown that uses a spiral spring.

Figure 9A:
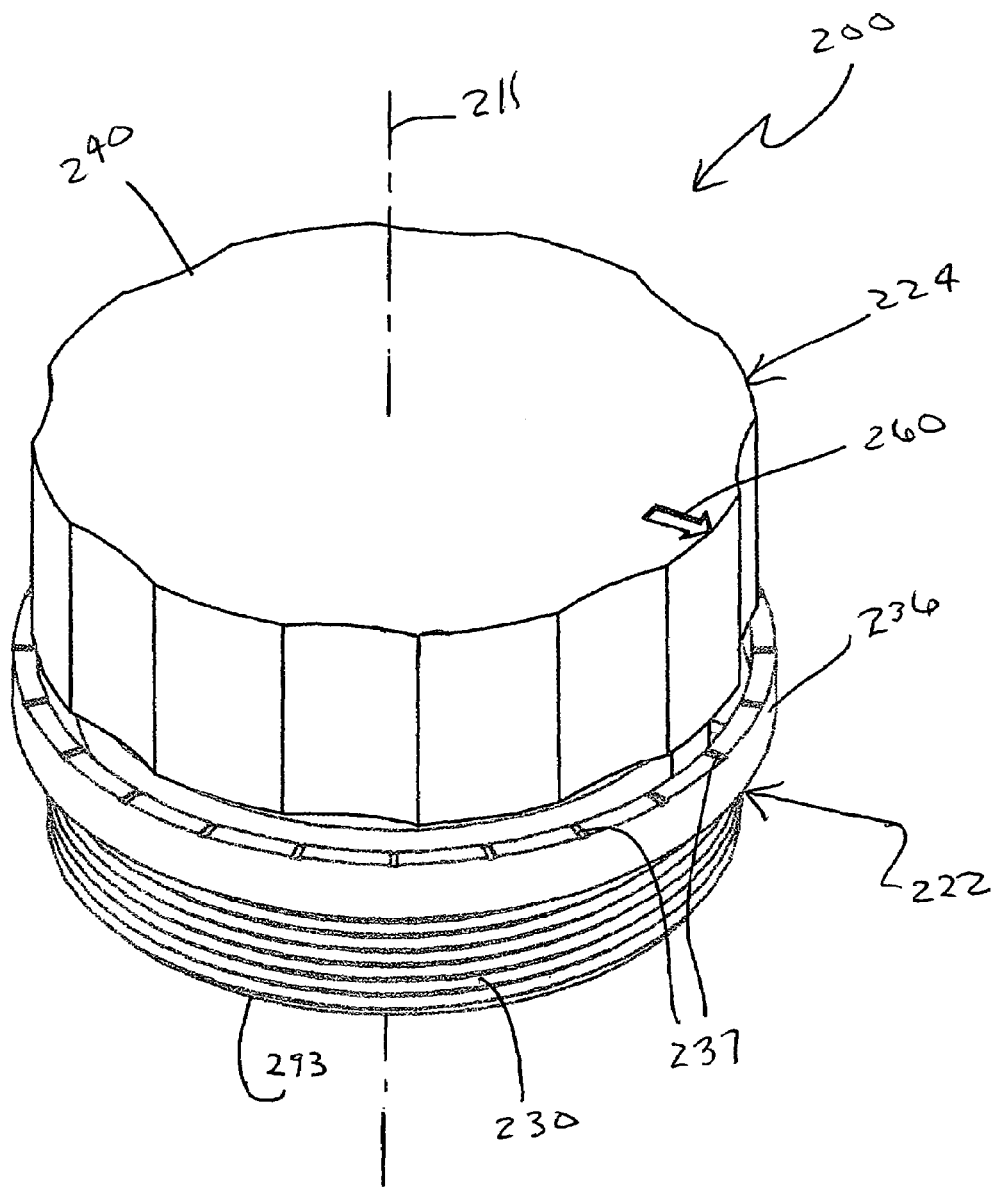
FIG. 9A is a perspective view of another exemplary torque indicating assembly that may be used with any number of different adapters having a threaded opening configured for operation with the torque indicating assembly.

FIG. 9A shows a top perspective view of the torque indicating assembly 200 for use in applying a force (e.g., directly or indirectly) upon the packaged device 15 received in the socket cavity 103 of the adapter body 101. FIG. 9B shows a exploded perspective view of the torque indicating assembly 200 shown in FIG. 9A and FIG. 9C shows a more detailed top perspective view of a portion of a threaded interface member 222 of the torque indicating assembly 200 with a spiral spring 270 positioned thereon.

As shown in FIGS. 9A-9C, the torque indicating assembly 200 includes the threaded interface member 222 including a threaded portion 230 configured to mate with the threaded opening 105 of the adapter body 101. The torque indicating assembly 200 further includes a torque applicator 224 coupled to the threaded interface member 222 such that torque applied to the torque applicator 224 is transferred to the threaded interface member 222 to move the threaded portion 230 thereof into the threaded opening 105 of the adapter body 101.

The torque applicator 224 is coupled to the threaded interface member 222 using the spiral spring 270. For example, the torque applicator 224 is coupled to the threaded interface member 222 such that when no torque is applied to the torque applicator 224 the spiral spring 270 is in a normal state. When torque is being applied to the threaded interface member 222 via the torque applicator 224, the torque indicator (e.g., one or more graduation 237 marks provided on a flange 236 of the threaded interface member 222 and a pointing indicator 260 provided on the torque applicator 224) is indicative of the torque being applied. When the threaded interface member 222 is released after torque has been applied, the spiral spring 270 returns to the normal state.

The threaded interface portion 222 includes a cylindrical body portion 225 extending along the axis 211 of the torque indicating assembly 200 from a first end region 226 to a second end region 228. At least a portion of the outer surface of the cylindrical body portion 225 includes the threaded portion 230 configured to mate with the threaded opening 105 of the adaptor body 101 (see FIG. 3). The first end region 226 includes the lower end surface 293 for use in interfacing directly or indirectly with a packaged device 15 received in the socket cavity 103. The second end region 228 of the cylindrical body portion 225 defines one or more openings for use in coupling the threaded interface member 222 to the torque applicator 224 using the spiral spring 270.

The spiral spring 270, as shown in FIGS. 9B and 9C, includes a body portion 272 terminating at first leg 274 and second leg 276. As a load is applied to the spiral spring 270, the spring's diameter will decrease.

As shown in FIG. 9B various openings are defined by the second end region 228 of the cylindrical body portion 225. For example, opening 284 defined at axis 11 is configured to receive at least a portion of the second leg 276 of the spiral spring 270 to hold or fix the second leg 276 of the torsion spring 270 in place when torque is applied to the torque applicator 224. Still further, two projection slots 288 with contact ends 290 are defined for receiving one or more projections 286 of the torque applicator 224.

The threaded interface member 222 further includes the flange portion 236 extending radially from the cylindrical body portion 225 at a distance from the axis 11 between the first and second end regions 226 and 228. The flange portion 236 includes an upper surface 292 that includes one or more graduation marks 237 thereon. The graduation marks 237 may be provided in any known manner as long as such marks are suitable for use with pointer 260 of the torque applicator 224 in providing an indication of torque being applied to the threaded interface member 222 when it is turned into opening 105 of the adapter apparatus 10.

The torque applicator 224 that is coupled to the threaded interface member 222 with use of at least the spiral spring 270 includes a cover body structure 240 extending between a first end region 242 and a second end region 244 thereof. Generally, although not shown, one or more openings are defined and one or more other elements are provided by the cover body structure 240. For example, a radial opening is defined about axis 11 at least in part by a cylindrical outer surface portion 267 of the cover body structure 240 to receive at least a portion of the body portion 272 of the spiral spring 270. Further, a first leg retaining structure or opening (although not shown) to retain first leg 284 is defined to hold or fix the first leg 274 of the spiral spring 270 in place when torque is applied to the torque applicator 224. Still further, two projections 286 extend towards the bottom of the torque applicator 224 at the first end region 242 to interact with the projection slots 288 of the threaded interface member 222.

The cover body structure 240 includes, at least in one embodiment, the cylindrical outer surface portion 267. The cylindrical outer surface portion 267 includes a pointer 260 associated therewith for use in providing an indication of the amount of torque applied to the torque indicating assembly 200 when in use with the graduation marks 237 provided on the flange 236 of the threaded interface member 222.

As assembled, the spiral spring 270 is in a normal state and the torque indicator (e.g., graduation marks 237 and pointer 260) would show that no torque is being applied. However, when torque is applied, the threaded interface member 222 is turned into opening 105 of the adapter apparatus 10, and, depending on the torque applied to the torque applicator 224, a force is applied to the packaged device 15. As the torque applicator 224 is turned, the torque indicator (e.g., graduation marks 237 and pointer 260) would show the force exerted on the packaged device 15 (i.e., corresponding to the torque applied). When the user sees from the torque indicator that a desired force is reached, the user no longer exerts any further torque. When release, the spiral spring 270 goes back to the normal state. In other words, the threaded interface member 222 is moved into the threaded opening 105 of the adaptor body 101 until the user recognizes from the torque indicator that a desired force on the packaged device 15 has been reached.

In operation, with the packaged device 15 received within the socket cavity 103 and the lid 104 being coupled to the socket base 102 (e.g., latched), the torque indicating assembly 200 applies a torque to the packaged device 15 and the torque indicator (e.g., graduation marks 237 and pointer 260) provides an indication representative of the amount of torque being applied. For example, in operation, the threaded interface member 222 of the torque indicating apparatus 200 is inserted into threaded opening 105 of the socket lid 104. Using the torque applicator 224 which is coupled to the threaded interface member 222 using the spiral spring 270, the threaded portion 230 is turned into threaded opening 105 of socket lid 104. As the threaded interface member 222 is turned into the opening 105, the lower surface 293 of the threaded interface member 222 contacts the upper surface of the floating compression plate 140 such that the lower surface of the compression plate 140 comes in direct contact with the upper surface 190 of the packaged device 15. As the adaptor body 101 is mounted relative to the structure including conductive elements 18, effective electrical contact between the aligned contact elements 16 and the arranged conductive elements 18 is achieved.

As the torque applicator 224 continues to be turned, additional force is applied onto packaged device 15. More specifically, with the first and second legs 274, 276 fixed in the first leg slot 284 of the threaded interface member 222 and second leg slot (not shown) of the torque applicator 224, as the torque applicator 224 is turned in the clockwise direction, the projections 286 of the torque applicator 224 travel within the projection slots 288 of the threaded interface member 222 until they reach ends 290 of the slots 288. Once contact is made and further clockwise torque is applied to the torque applicator 224, torque is transferred to the threaded interface member 222 via the spiral spring 270. When lower surface 293 of the threaded interface member 222 reaches the upper surface 190 of the packaged device 15, a force based on the torque applied to the torque applicator 224 is applied to the packaged device 15.

As the torque applicator 224 is continued to be turned in the clockwise direction and force is applied to the packaged device 15, the torque applicator 224 will begin to move clockwise relative to the threaded interface member 222. As such, the pointer 260 of the torque applicator 224 will move relative to the graduation marks 237 on flange 236 of the threaded interface member 222 to show the amount of torque being applied (e.g., representative of the force applied to the packaged device 15). The user can then stop applying torque when desired (e.g., a certain mark of the graduation marks may indicate the desired torque to be applied). When the user releases the torque applicator 224, the spiral spring 270 returns to normal state (e.g., back to a normal inner and outer diameter). Upon release, the threaded portion 230 of the threaded interface member 222 remains in the same position in the threaded opening 105, and only the spiral spring 270 (and as such the torque applicator 224) returns to the original start position (e.g., the pointer returns to its original position relative to the graduation marks) as no torque is being transferred to the threaded interface member 222 after release.

To turn the threaded interface member 222 out of the threaded opening 105, the torque applicator 224 is turned in the counterclockwise direction. In such a manner, the projections 286 will travel in the slots 288 in the opposite direction and make contact with the other ends 290 of the projection slots 288. Continuing to turn in the counterclockwise direction will engage the torque applicator 224 with the threaded interface member 222 and unscrew the threaded interface member 222 from the threaded opening 105.

Further, as one skilled in the art will recognize, other techniques for providing an indication of the force being applied to the packaged device 15 may be used according to the present invention. For example, as shown in FIGS. 10A-10D, a torque indicating assembly 300 is shown that uses sensor associated components to provide a visual indication (e.g., drive a light emitting diode) when a predetermined force is applied to the packaged device 15.

Figure 10A:
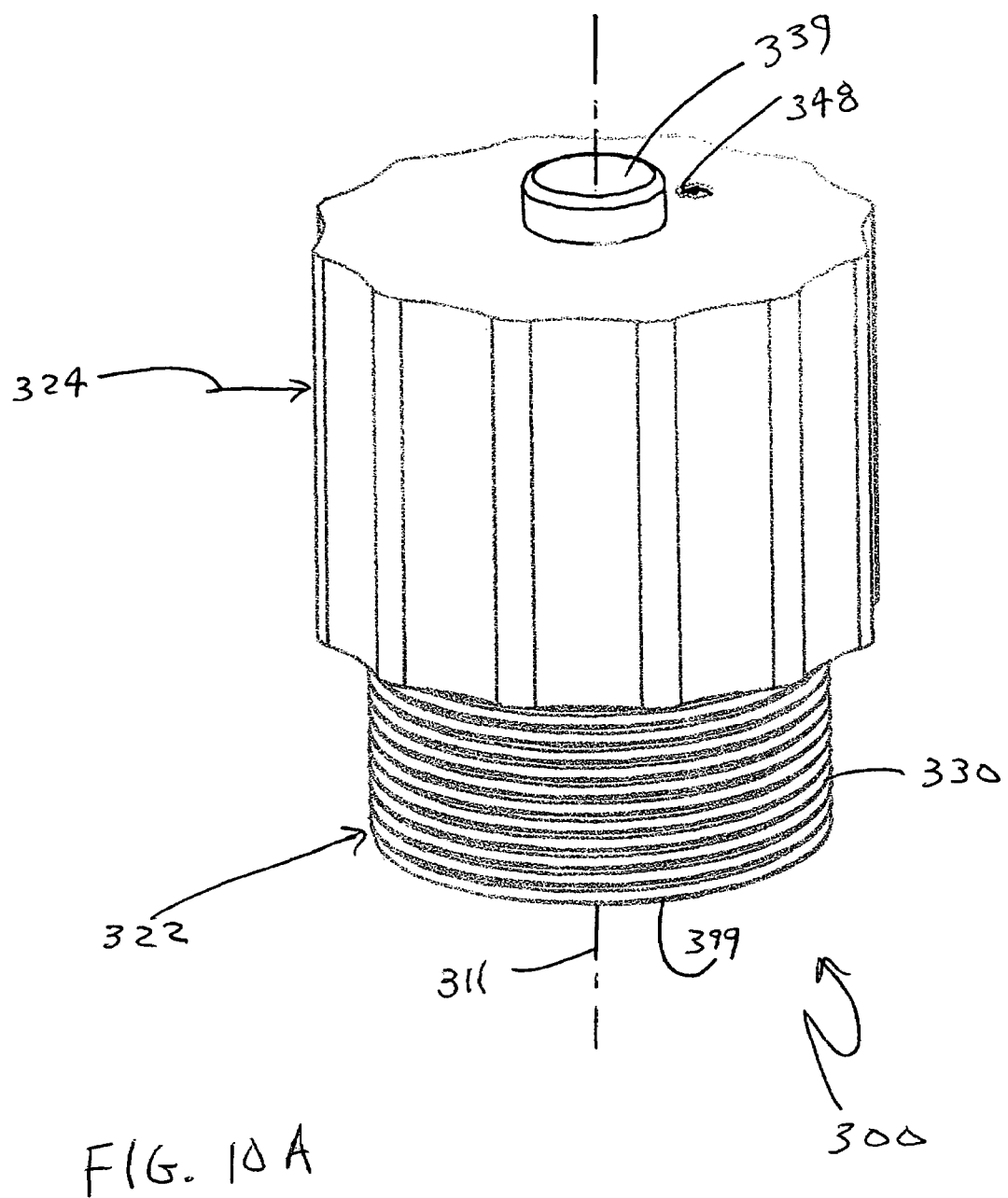
FIG. 10A is a perspective view of yet another exemplary torque indicating assembly that may be used with any number of different adapters having a threaded opening configured for operation with the torque indicating assembly.
Figure 10B:
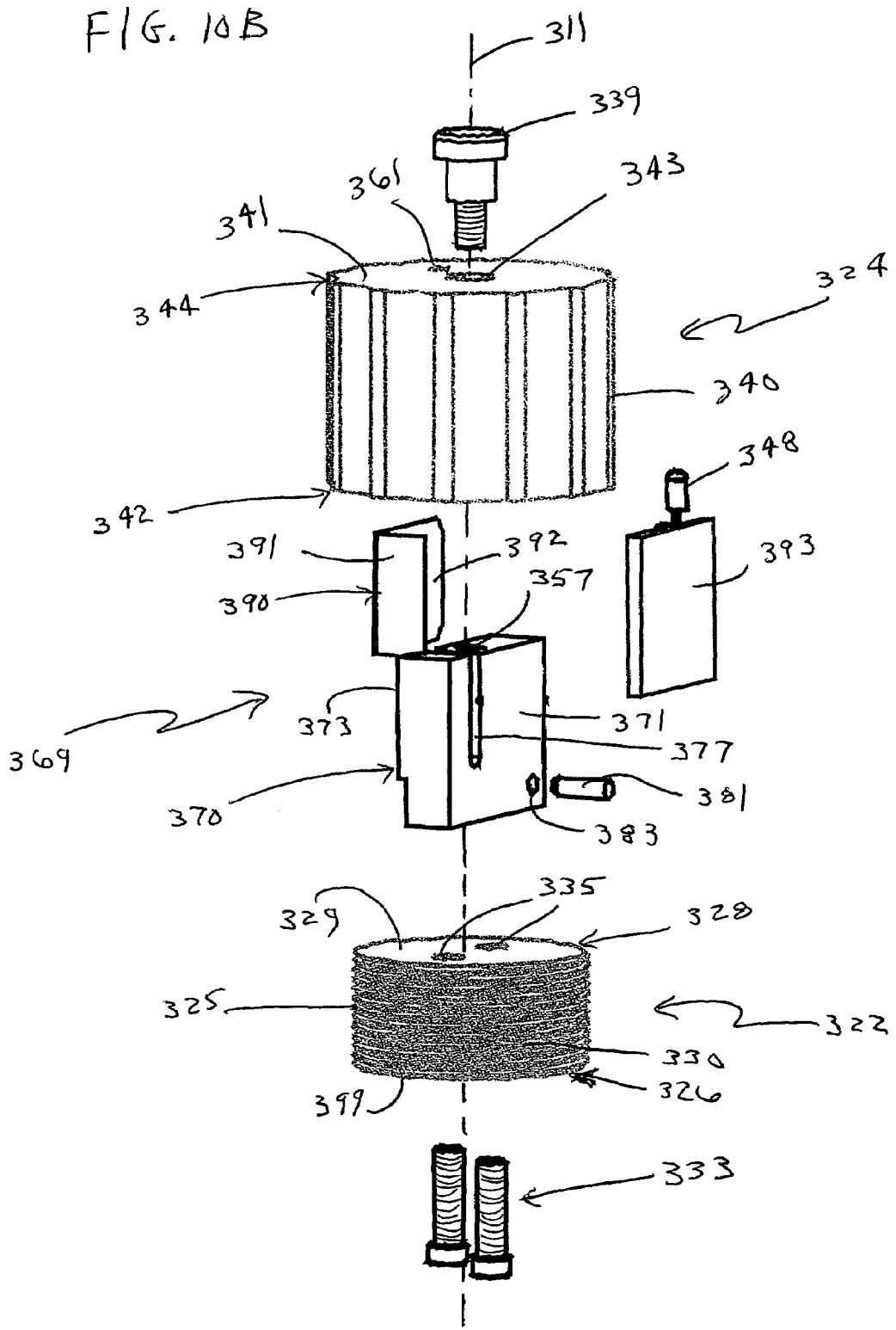
FIG. 10B is an exploded perspective view of the torque indicating assembly shown in FIG. 10A.
Figure 10C:
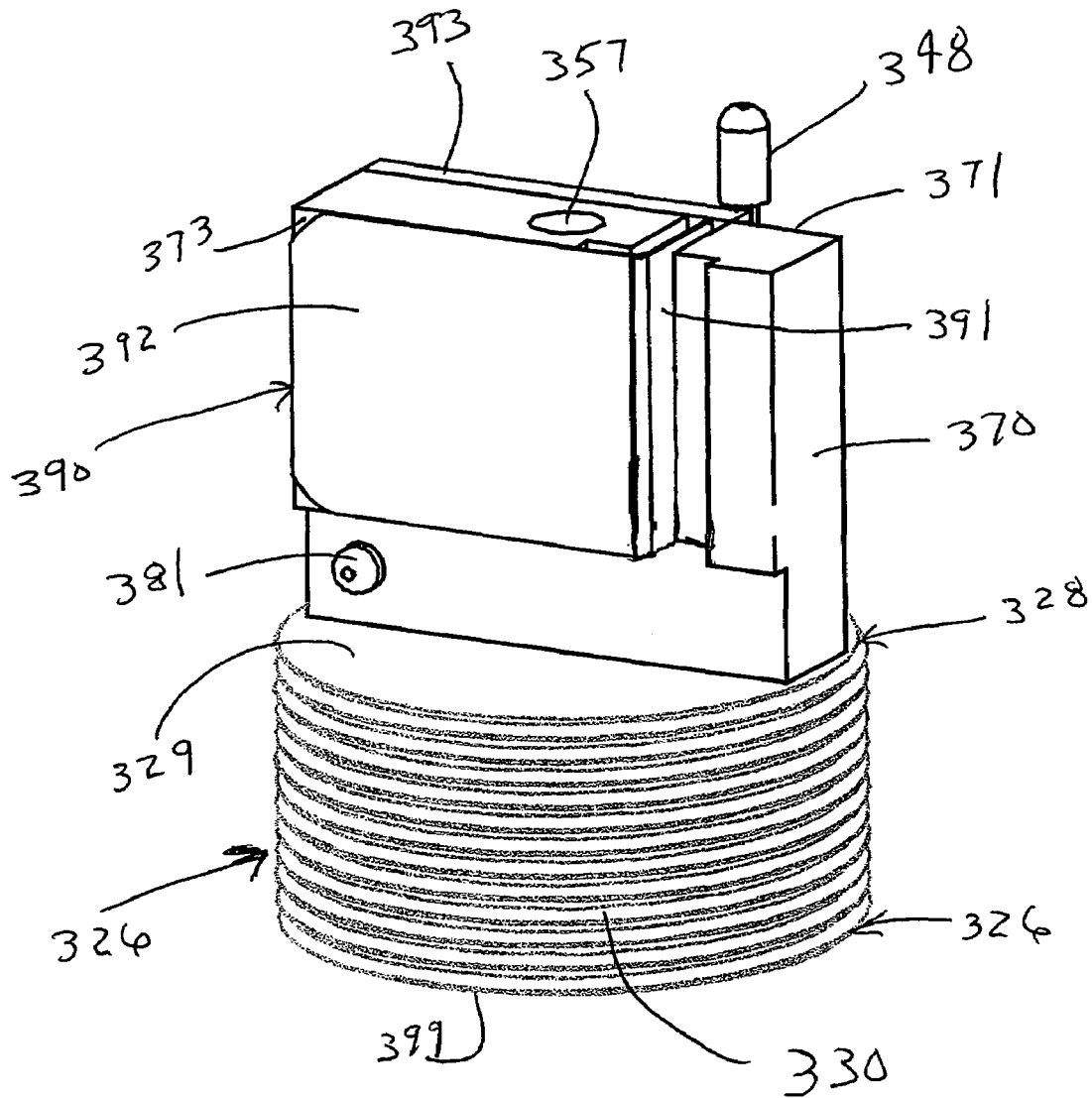
FIG. 10C is a more detailed perspective view of one embodiment of a portion of an exemplary threaded interface member for use in a torque indicating assembly such as that shown in FIGS. 10A-10B along with one or more sensor components and user indication components used therewith.

FIG. 10A shows a top perspective view of the torque indicating assembly 300 for use in applying a force (e.g., directly or indirectly) upon the packaged device 15 received in the socket cavity 103 of the adapter body 101. FIG. 10B is an exploded perspective view of the torque indicating assembly 300 shown in FIG. 10A. FIG. 10C is a more detailed perspective view of one embodiment of a portion of a threaded interface member 322 used in the torque indicating assembly 300 shown in FIGS. 10A-10B along with one or more sensor components and user indication components used therewith and FIG. 10D is a bottom view of a portion of a torque applicator 324 used in the torque indicating assembly 300 shown in FIGS. 10A-10B along with one or more sensor components and user indication components used therewith.

As shown in FIGS. 10A-10D, the torque indicating assembly 300 includes the threaded interface member 322 including a threaded portion 330 configured to mate with the threaded opening 105 of the adapter body 101. The torque indicating assembly 300 further includes the torque applicator 324 coupled to the threaded interface member 322 such that torque applied to the torque applicator 324 is transferred to the threaded interface member 322 to move the threaded portion 330 thereof into the threaded opening 105 of the adapter body 101.

The torque applicator 324 is coupled to the threaded interface member 322 using various sensor associated components 369. For example, the torque applicator 324 is coupled to the threaded interface member 322 such that when no torque is applied to the torque applicator 324 the sensor detects that no such torque is present. When torque is being applied to the threaded interface member 322 via the torque applicator 324, the sensor components 369 detect that torque is being applied, and when a predetermined amount of torque is measured, a user indication element is activated (e.g., a light emitting diode 348 is lit). When the threaded interface member 322 is released after torque has been applied, the user indication element is deactivated.

The threaded interface portion 322 includes a cylindrical body portion 325 extending along the axis 311 of the torque indicating assembly 300 from a first end region 326 to a second end region 328. At least a portion of the outer surface of the cylindrical body portion 325 includes the threaded portion 330 configured to mate with the threaded opening 105 of the adaptor body 101 (see FIG. 3). The first end region 326 includes the lower end surface 399 for use in interfacing directly or indirectly with a packaged device 15 received in the socket cavity 103. The second end region 328 of the cylindrical body portion 325 defines a surface 329 upon which one or more sensor associated components 369 are mounted. Further, at least one opening 335 is defined through the cylindrical body portion 325 to receive threaded screws 333 for use in coupling the threaded interface member 322 to the torque applicator 324 via mounting plate 370 which has corresponding openings 349 defined therein.

The sensor associated components 369 mounted on the surface 329 include at least a mounting plate 370, a circuit board 393 with associated and suitable electronic circuitry for performing the functionality described herein as well as a light emitting diode 348 mounted thereto, a sensing element 390, and a battery push button 381. Generally, the mounting plate 370 includes a first side 371 and a second opposite side 373. The plate 370 further has a thickness through which a sensor slot 377 is defined from the first side 371 to the second side 373 for receiving a portion of the sensor element 390. One will recognize that different functionality may be provided by the circuitry on the circuit board (e.g., set different force limits, drive the light emitting diode to blink when close to predetermined force, provide buzzer beeps, drive buzzer with close to predetermined force, provide tactile indication, etc.). However, the present invention is in no manner limited to any particular electronics used to provide such functionality. Any circuit configuration that can implement the indication functionality is suitable according to the present invention.

The sensor element 390 includes a first portion 391 to be positioned in sensor slot 377 and a second portion 392 that is generally orthogonal to the first portion 391. When the first portion 391 is positioned in sensor slot 377, the second portion 392 lies adjacent the second side 373 of the mounting plate 370 and the first portion 391 is electrically connected to the circuit board 393 that is mounted on the first side 371 of the mounting plate 370. The circuit board 393 is mounted on the first side 371 of the mounting plate 370 such that the light emitting diode 348 is positioned into opening 361 of the torque applicator 324.

Further, an opening 383 is defined through the mounting plate 370, as shown in FIG. 10B, for mounting the battery push button 381. The battery push button 381 includes a first end that projects from the second side 373 of the mounting plate 370. A second end of the push button 381 is adjacent circuitry that can be activated to provide power to the sensor components when a force is applied to the push button 381 moving it in a normally off position to an activation position in contact with battery circuitry on the circuit board 393. Further, the mounting plate 370 includes an additional threaded opening 357 for coupling the torque activator 324 thereto using threaded mounting screw 339.

The torque applicator 324 that is coupled to the threaded interface member 322 includes a cylindrical cover body structure 340 extending between a first end region 342 and a second end region 344 thereof. An opening or cavity 363 for receiving the sensor associated components 369 is defined by the body structure 340. At least one activation surface 365 defining the cavity 363 is positioned for contact with the sensor element 390 when torque is applied to the torque applicator 324. At least in one embodiment, the surface 365 is flat and lies parallel to the axis 311.

Further, an opening 343 is defined in the upper surface 341 along the axis 311 at the second end 344 of the torque applicator 324 for use in mounting the body structure 340 to the mounting plate 370 via threaded opening 357 and threaded screw 339. In addition, opening 361 for allowing the light emitting diode 348 to project through the upper surface 341 is also defined.

As assembled, the sensor associated components 369 are in a normal state (e.g., the battery push button 381 has not activated the power source of the circuit board 393 and the second portion 392 of the sensor element 390 is spaced from the second side 373 of the mounting plate 370). The light emitting diode 348 would not be activated indicating that a predetermined torque had not be applied. However, when torque is applied, the threaded interface member 322 is turned into opening 105 of the adapter apparatus 10. In other words, when the torque applicator 324 is turned, the threaded interface member 322 is turned into the threaded opening 105 and, depending on the torque applied to the applicator 324, a force is applied to the packaged device 15. As the torque applicator 324 is turned and when a predetermined torque is sensed, the torque indicator (e.g., the light emitting diode 348) is driven to show that a desired force has been exerted on the packaged device 15 (i.e., a torque corresponding thereto). When the user sees from the torque indicator 348 that a desired force is reached, the user no longer exerts any further torque. When release, the sensor associated components 369 would go back to the normal state. In other words, the threaded interface member 322 is moved into the threaded opening 105 of the adaptor body 101 until the user recognizes from the torque indicator that a desired force on the packaged device 15 has been reached.

In operation, with the packaged device 15 received within the socket cavity 103 and the lid 104 being coupled to the socket base 102 (e.g., latched), the torque indicating assembly 300 applies a torque to the packaged device 15 and the torque indicator (e.g., light emitting diode 348) provides an indication representing that a predetermined amount of torque has been applied (e.g., the amount of torque necessary to activate the light emitting diode may be set by a user). For example, in operation, the threaded interface member 322 of the torque indicating apparatus 300 is inserted into threaded opening 105 of the socket lid 104. As the threaded interface member 322 is turned into the opening 105, the lower surface 399 of the threaded interface member 322 contacts the upper surface of the floating compression plate 140 such that the lower surface of the compression plate 140 comes in direct contact with the upper surface 190 of the packaged device 15. As the adaptor body 101 is mounted relative to the structure including conductive elements 18, effective electrical contact between the aligned contact elements 16 and the arranged conductive elements 18 is achieved.

As the torque applicator 324 continues to be turned, additional force is applied onto packaged device 15. More specifically, as the threaded interface member 322 is turned into the opening 105, the activation surface 365 defining at least a portion of the cavity 363 in the torque activator 324 contacts the battery push button 381 and moves it through the opening 383 to activate power to the sensor associated components 369 (e.g., the push button contact a switch on the circuit board 393).

After power is activated, and the torque applicator 324 continues to be turned in the clockwise direction, the same activation surface 365 applies pressure to the sensor element 390 (e.g., a pressure sensor) and a signal representative of the pressure applied thereto is provided to the circuit board 393. Electronic circuitry, e.g., logic circuitry, may be used to monitor the signal and drive the light emitting diode 348 when a predetermined pressure is detected. The user can then stop applying torque when desired (e.g., the light emitting diode is lit). When the user releases the torque applicator 324, the sensor associated components 369 return to the normal state. Upon release, the threaded portion 330 of the threaded interface member 322 remains in the same position in the threaded opening 105, and only the other components, such as the torque applicator 324, return to the original start position (e.g., the light emitting diode turns off).

One will recognize that one or more different sensors may be used to measure the torque exerted. For example, in addition to a pressure sensor, sensors such as bend sensors, or other resistive type sensors, may be used. Further, although one configuration of a sensor based assembly is described herein, the present invention is not limited to only such a configuration as other types of sensors may require different configurations to allow for sensing of the torque applied to be measured.

All patents and references cited herein are incorporated in their entirety as if each were incorporated separately. This invention has been described with reference to illustrative embodiments and is not meant to be construed in a limiting sense. As described previously, one skilled in the art will recognize that various other illustrative adapter assembly embodiments may be provided which utilize various combinations of the elements described herein. Various modifications of the illustrative embodiments, as well as additional embodiments of the invention and combinations of various elements herein, will be apparent to persons skilled in the art upon reference to this description. It is therefore contemplated that the patented claims will cover any such modifications or embodiments that may fall within the scope of the present invention as defined by the accompanying claims.

What is claimed is:

1. An adapter apparatus for use with a packaged device having a plurality of contact elements disposed on a surface thereof, the adapter apparatus comprising:
    an adapter body defining a socket cavity configured to receive a packaged device such that the plurality of contact elements of the packaged device are at least aligned with arranged conductive elements corresponding thereto, and further wherein the adapter body comprises a threaded opening; and
    a torque indicating assembly for use in applying a force upon a packaged device received in the socket cavity of the adapter body, wherein the torque indicating assembly comprises:
        a threaded interface member comprising a threaded portion configured to mate with the threaded opening of the adapter body;
        a torque applicator coupled to the threaded interface member such that torque applied to the torque applicator is transferred to the threaded interface member to move the threaded portion thereof into the threaded opening of the adapter body; and
        a torque indicator, wherein the torque indicator provides at least one of a visual indication and an auditory indication representative of the torque being applied to the threaded interface member.

2. The adapter apparatus of claim 1, wherein torque applicator is coupled to the threaded interface member using a torsion element.

3. The adapter apparatus of claim 2, wherein the torque applicator is coupled to the threaded interface member such that when no torque is applied to the torque applicator the torsion element is in a normal state, when torque is being applied to the threaded interface member the torque indicator is indicative of the torque being applied, and when the threaded interface member is released after torque has been applied the torsion element returns to the normal state.

4. The adapter apparatus of claim 2, wherein the torsion element comprises one of a torsion spring and a spiral spring.

5. The adapter apparatus of claim 2, wherein the torque indicator comprises one or more graduation marks provided on a portion of the threaded interface member and a pointing indicator provided on the torque applicator.

6. The adapter apparatus of claim 1, wherein the torque applicator is coupled to the threaded interface member using one or more sensor components such that when torque is being applied to the threaded interface member the one or more sensor components are used to detect the torque applied and provide a signal indicative thereof.

7. The adapter apparatus of claim 6, wherein the torque indicator comprises a user indication element operated based on the torque detected by the one or more sensor components.

8. The adapter apparatus of claim 7, wherein the indication element comprises a light emitting diode.

9. The adapter apparatus of claim 6, wherein the one or more sensor components comprise a pressure sensing element.

10. The adapter apparatus of claim 1, wherein the adapter body defining a socket cavity therein configured to receive a packaged device comprises:
a socket base defining the socket cavity therein configured to receive a packaged device; and
a socket lid to close the socket cavity hinged to the socket base, wherein the socket lid comprises the threaded opening for mating with the threaded portion of the threaded interface member.

11. The adapter apparatus of claim 10, wherein the adapter apparatus further comprises a compression plate coupled to the socket lid such that a force applied by the torque indicating assembly upon a packaged device received in the socket cavity is applied via the compression plate positioned between the threaded portion of the threaded interface member and a packaged device received in the socket cavity.

12. The adapter apparatus of claim 1, wherein the threaded interface member comprises a cylindrical body portion extending along an axis of the torque indicating assembly from a first end region to a second end region, the first end region for use in interfacing directly or indirectly with a packaged device received in the socket cavity and the second end region comprising one or more coupling elements for use in coupling the torque applicator thereto.

13. The adapter apparatus of claim 12, wherein the torque applicator comprises a cover structure that defines a radial cavity about the axis of the torque indicating assembly extending between a first end region and a second end region of the torque indicator, wherein the cover structure comprises one or more coupling elements, and further wherein a torsion element is engaged with at least one of the coupling elements at the second end region of the threaded interface member and at least one of the coupling elements of the cover structure for use in coupling the threaded interface member and the torque applicator.

14. The adapter apparatus of claim 1, wherein the torque applicator comprises a handle for use in applying torque.

15. A method of loading a packaged device in an adapter apparatus, wherein the packaged device comprises a plurality of contact elements disposed on a surface thereof, wherein the method comprises:
providing an adapter body defining a socket cavity therein configured to receive a packaged device, wherein the adapter body comprises a threaded opening;
providing a torque indicating assembly for use in applying a force upon a packaged device received in the socket cavity of the adapter body, the torque indicating assembly comprising a threaded interface member comprising a threaded portion configured to mate with the threaded opening of the adapter body and a torque applicator coupled to the threaded interface member such that torque applied to the torque applicator is transferred to the threaded interface member to move the threaded portion thereof into the threaded opening of the adapter body, and further wherein the torque indicating assembly comprises a torque indicator representative of torque being applied to the threaded interface member;
positioning a packaged device in the socket cavity such that the plurality of contact elements of the packaged device are at least aligned with arranged conductive elements corresponding thereto;
inserting the threaded portion of the threaded interface member into the threaded opening of the adapter body;
turning the torque applicator of the torque indicating assembly for use in applying a force on the packaged device positioned in the socket cavity such that the plurality of contact elements of the packaged device are in electrical contact with the arranged conductive elements corresponding thereto, wherein the threaded interface member is turned into the threaded opening of the adapter body as the torque applicator is turned; and
providing at least one of a visual indication and an auditory indication using the torque indicator representative of the force applied to the packaged device.

16. The method of claim 15, wherein providing the adapter body defining a socket cavity therein configured to receive a packaged device comprises providing a socket base defining the socket cavity therein configured to receive a packaged device and a socket lid hinged to the socket base to close the socket cavity, wherein the socket lid comprises the threaded opening defined for mating with the threaded portion of the threaded interface member, and further wherein positioning a packaged device in the socket cavity comprises:
opening the socket lid and positioning a packaged device in the socket cavity such that the plurality of contact elements of the packaged device are at least aligned with arranged conductive elements corresponding thereto; and
closing and latching the socket lid to the socket base.

17. The method of claim 15, wherein the torque applicator is coupled to the threaded interface member using a torsion element, and further wherein the torque indicator comprises one or more graduation marks provided on a portion of the threaded interface member and a pointing indicator provided on the torque applicator.

18. The method of claim 15, wherein the torque applicator is coupled to the threaded interface member using one or more sensor components such that when torque is being applied to the threaded interface member the one or more sensor components are used to detect the torque applied and provide a signal indicative thereof, and further wherein the torque indicator comprises a user indication element operated based on the torque detected by the one or more sensor components.

19. The method of claim 15, wherein providing an indication using the torque indicator representative of the force applied to the packaged device comprises activating an indicator when a predetermined force is reached.

20. The method of claim 15, wherein providing an indication using the torque indicator representative of the force applied to the packaged device comprises providing a graduated indication of the force being applied.

21. An adapter apparatus for use with a packaged device having a plurality of contact elements disposed on a surface thereof, the adapter apparatus comprising:
an adapter body defining a socket cavity configured to receive a packaged device such that the plurality of contact elements of the packaged device are at least aligned with arranged conductive elements corresponding thereto, wherein the adapter body comprises a threaded opening; and
a torque indicating assembly for use in applying a force upon a packaged device received in the socket cavity of the adapter body, wherein the torque indicating assembly comprises:
a threaded interface member comprising a threaded portion configured to mate with the threaded opening of the adapter body, wherein the threaded portion of the threaded interface member is turned into the threaded opening of the adapter body to apply a force, either directly or indirectly, to a packaged device received in the socket cavity; and a torque indicator, wherein the torque indicator provides at least one of a visual indication and an auditory indication representative of the force applied to the packaged device.

22. The adapter apparatus of claim 21, wherein the adapter apparatus further comprises a torque applicator coupled to the threaded interface member such that torque applied to the torque applicator is transferred to the threaded interface member to move the threaded portion thereof into the threaded opening of the adapter body.

23. The adapter apparatus of claim 22, wherein torque applicator is coupled to the threaded interface member using a torsion element.

24. The adapter apparatus of claim 23, wherein the torque applicator is coupled to the threaded interface member such that when no torque is applied to the torque applicator the torsion element is in a normal state, when torque is being applied to the threaded interface member the torque indicator is indicative of the torque being applied, and when the threaded interface member is released after torque has been applied the torsion element returns to the normal state.

25. The adapter apparatus of claim 23, wherein the torsion element comprises one of a torsion spring and a spiral spring.

26. The adapter apparatus of claim 23, wherein the torque indicator comprises one or more graduation marks provided on a portion of the threaded interface member and a pointing indicator provided on the torque applicator.

27. The adapter apparatus of claim 22, wherein the torque applicator is coupled to the threaded interface member using one or more sensor components such that when torque is being applied to the threaded interface member the one or more sensor components are used to detect the torque applied and provide a signal indicative thereof.

28. The adapter apparatus of claim 27, wherein the torque indicator comprises a user indication element operated based on the torque detected by the one or more sensor components.

29. The adapter apparatus of claim 27, wherein the one or more sensor components comprise a pressure sensing element and a mounting plate having a slot defined therethrough between a first side and a second side of the mounting plate, wherein the pressure sensing element comprises a first portion mounted adjacent the first side of the mounting plate and a second portion extending from the first portion that is positioned through the slot for electrical connection to a circuit board mounted on the second side of the mounting plate.

30. The adapter apparatus of claim 27, wherein the one or more sensor components comprise a power source activator and a mounting plate having a first side and a second side, wherein at least a portion of the power source activator is mounted adjacent the first side of the mounting plate and provides for activation of a power source associated with a circuit board mounted on the second side of the mounting plate when torque is applied to the torque activator.

31. The adapter apparatus of claim 1, wherein the torque indicator provides a visual indication representative of the torque being applied to the threaded interface member.

32. The method of claim 15, wherein providing the at least one of a visual indication and an auditory indication using the torque indicator representative of the force applied to the packaged device comprises providing a visual indication using the torque indicator representative of the torque being applied to the threaded interface member.

33. The adapter apparatus of claim 21, wherein the torque indicator provides a visual indication representative of the torque being applied to the threaded interface member.

* * * * *